United States Patent [19]
Lehmkuhl

[11] Patent Number: 4,778,313
[45] Date of Patent: Oct. 18, 1988

[54] INTELLIGENT TOOL SYSTEM

[75] Inventor: Robert A. Lehmkuhl, Madison, N.J.

[73] Assignee: Manuflex Corp., Cincinnati, Ohio

[21] Appl. No.: 50,941

[22] Filed: May 18, 1987

[51] Int. Cl.⁴ .................. B23C 9/00; B23B 49/00; G01B 7/28
[52] U.S. Cl. .................. 409/127; 29/56.5; 33/559; 33/561; 408/3; 408/10; 409/194; 409/218
[58] Field of Search .................. 409/80, 187, 194, 196, 409/127, 218, 134, 193; 29/56.5, 26 A; 279/1 ME; 408/3, 10, 6, 11, 12, 13; 33/558, 561, 559, 556, 505; 364/560

[56] References Cited

U.S. PATENT DOCUMENTS

| | | | |
|---|---|---|---|
| 4,118,871 | 10/1978 | Kirkham | 364/560 |
| 4,360,973 | 11/1982 | McMurtry | 33/561 |
| 4,425,061 | 1/1984 | Kindl et al. | 409/218 |
| 4,447,958 | 5/1984 | Tanaka | 33/561 |
| 4,510,693 | 4/1985 | Cusack | 33/561 |
| 4,516,327 | 5/1985 | Kanda | 33/559 X |
| 4,523,063 | 6/1985 | Kroetsch | 33/561 X |
| 4,523,382 | 6/1985 | Werner | 33/561 |
| 4,530,159 | 7/1985 | Ernst | 33/559 X |
| 4,530,160 | 7/1985 | Feichtinger | 33/559 |
| 4,562,646 | 1/1986 | D'Anglio | 33/559 X |
| 4,579,487 | 4/1986 | Lehmkuhl | 409/134 |
| 4,612,709 | 9/1986 | Baisch et al. | 33/556 X |
| 4,612,831 | 9/1986 | Lehmkuhl | 408/3 |

Primary Examiner—William R. Briggs
Attorney, Agent, or Firm—Edward J. Utz

[57] ABSTRACT

An intelligent tool system used with computer numerical controlled machining centers consisting of an internal spindle machanism and a variety of spindle mounted devices.

The spindle mechanism provides CNC communicating and operating means with spindle mounted devices such as; telescoping tool holders for determining work surface locating with random length tools and for sensing tool condition; automatic boring tools for high precision boring and contouring; probing devices for work surface location, measurement and definintion; combination boring and probing tools for boring and measuring a hole without removing the tool from the spindle.

18 Claims, 16 Drawing Sheets

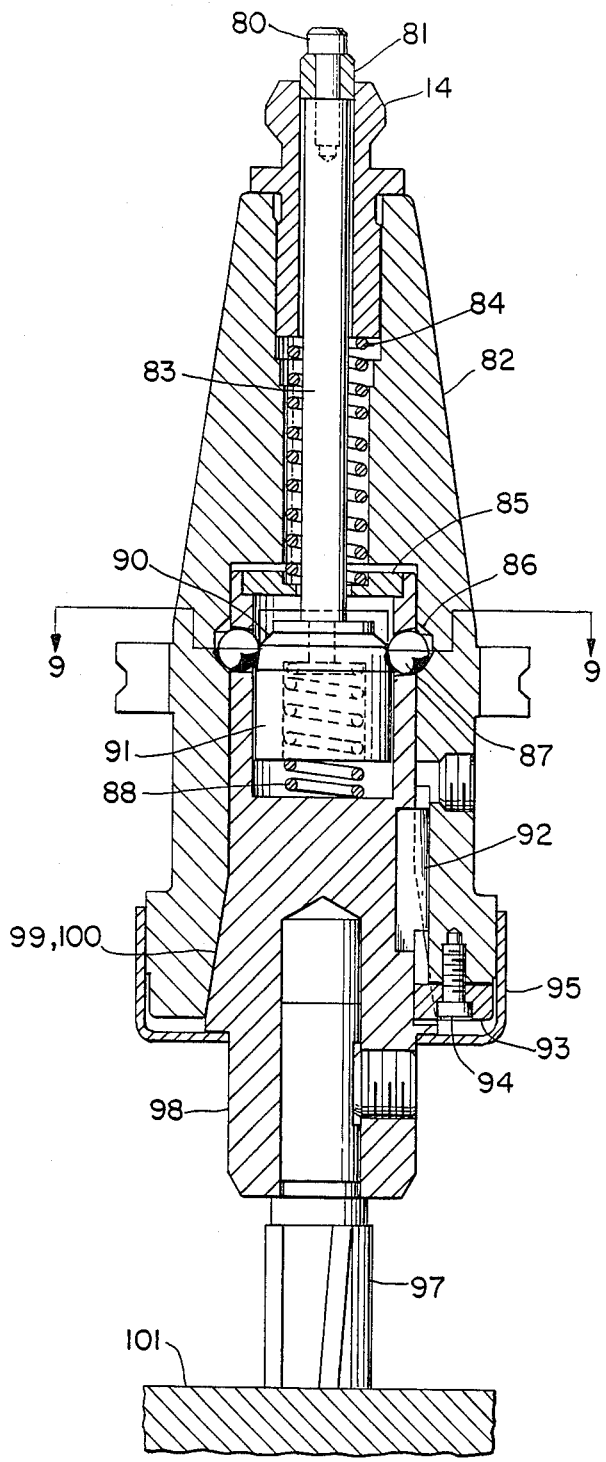
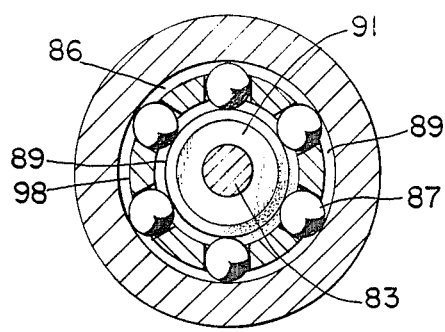
Fig. 8
Fig. 9

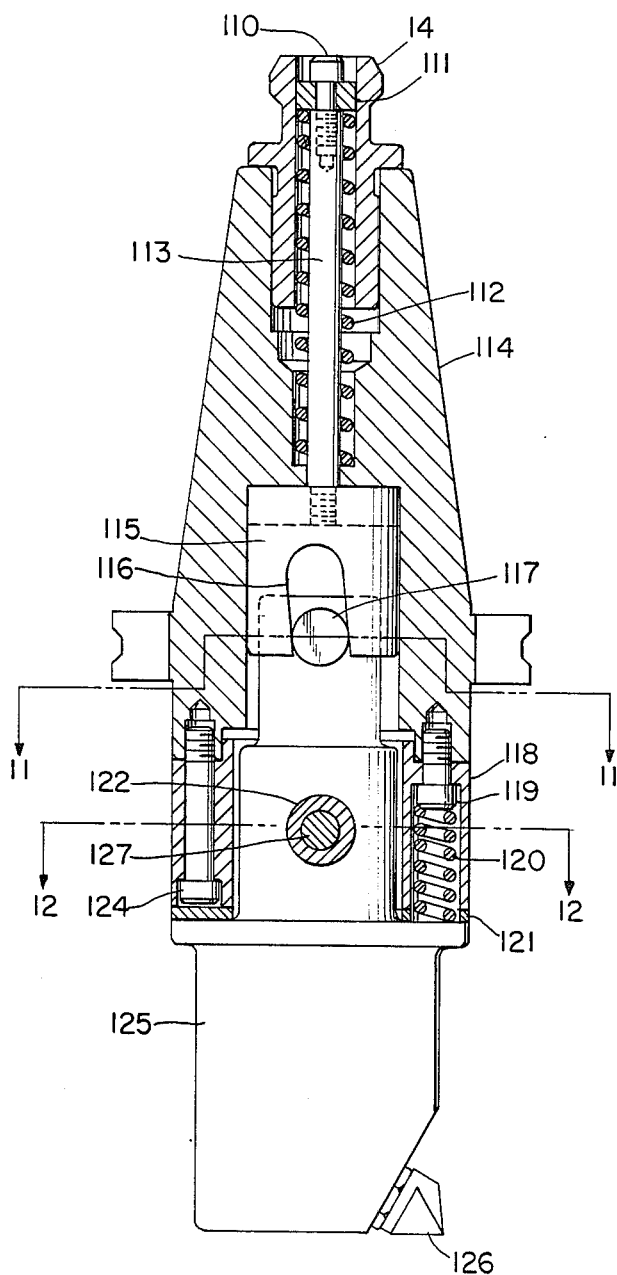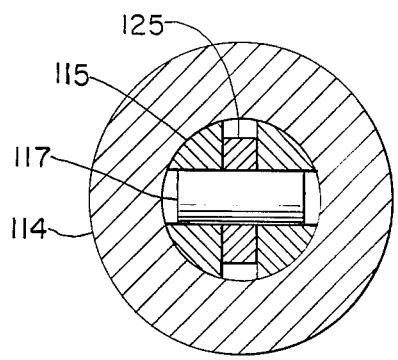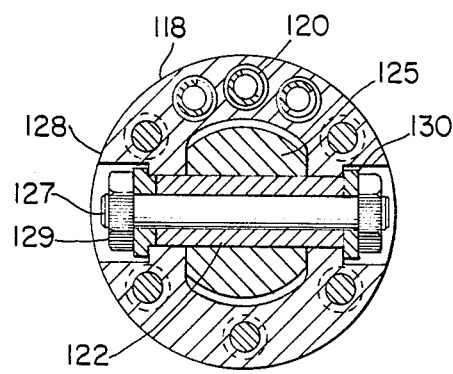

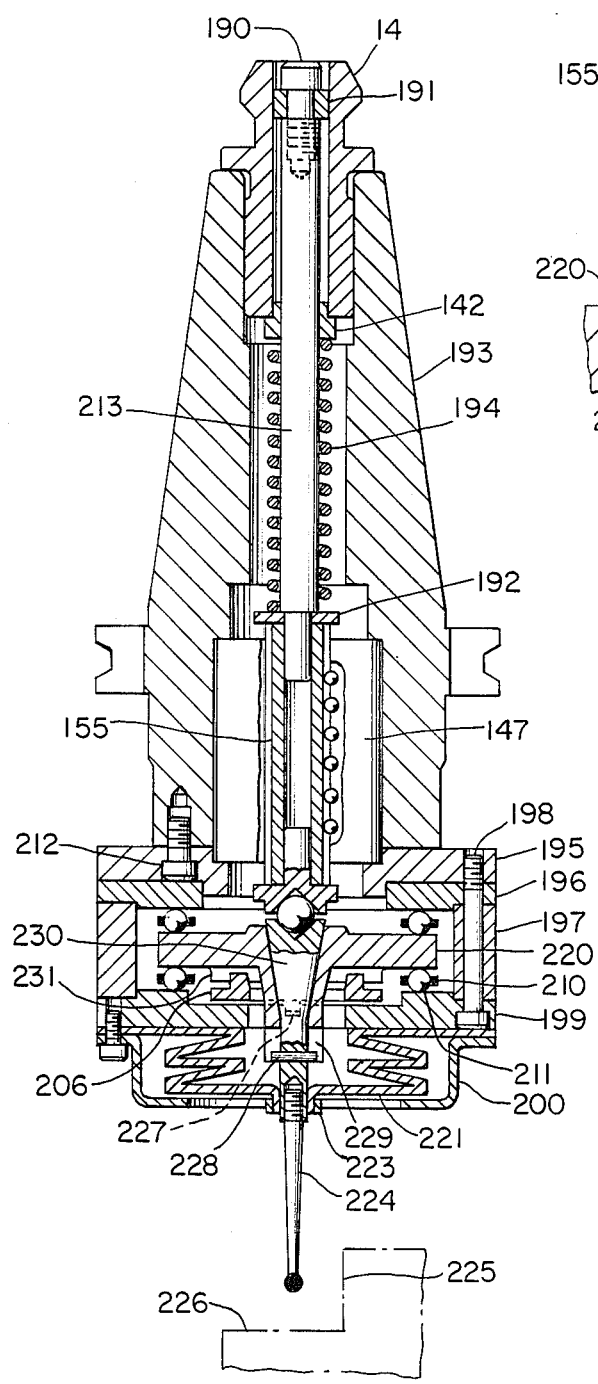
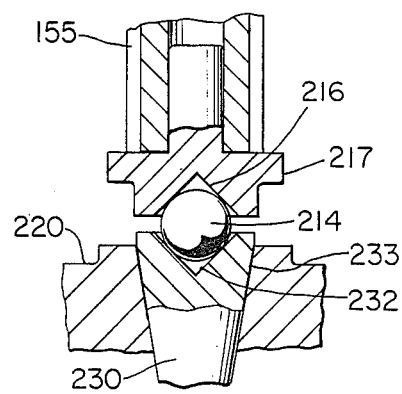
Fig. 17
Fig. 18

INTELLIGENT TOOL SYSTEM

OBJECTIVE

In machining centers that are used in an operator attended environment or in the case when such machining centers are part of a work cell or Flexible Manufacturing System, it is desirable to have tooling systems that can communicate with and/or be controlled by the machine system Computer Numerical Control.

Therefore the principle object of my invention is to provide a means of incorporating through the machining center spindle a method of operating a position sensitive encoder or transducer to communicate with the machine CNC.

Another object of my invention is to provide a means of incorporating through the machining center spindle a means of controlling the position and force of a tool control rod by the machine CNC.

Another object of my invention is to provide spindle mounted tool adapters having the means to operate the position sensitive encoder or transducer for sensing the location of work surfaces with random length tools.

Another object of my invention is to provide spindle mounted tool adapters having the means to operate the position sensitive encoder or transducer for sensing the failure or breakage of adapter mounted tools.

Previous to my invention it was necessary to reference tools to a position known as the "R" plane, therefore, another object of my invention is to eliminate the necessity for the reference plane, thereby reducing cycle time.

Still another object of my invention is to eliminate in programming of the workpiece the "R" plane dimension, since the "R" plane is determined by the surface sensing feature.

Another object of my invention is to eliminate the use of preset tools and set-up time for setting tool length offsets.

Another object of my invention is to eliminate feed rate programming of tapping operation by controlling the Z axis to follow the tap into and out of the hole.

Another object of my invention is to provide a spindle mounted tool adapter for milling that locks up for radial and axial rigidity after sensing the location of the work surface and is released under the control of the machine computer numerical control.

Another object of my invention is to verify the presence of the correct type of tool in the spindle by utilizing the encoder or transducer position and by controlling the force on the tool control rod.

Another object of my invention is to eliminate any error in spindle encoder feedback due to thermal growth by offsetting control or using incremental control after tool insertion into spindle.

Another object of my invention is to provide spindle mounted boring tools for machining centers that are capable of being automatically adjusted without operator intervention.

Another object of my invention is to control the boring tool adjustment by means of a tool control rod in the machining center spindle.

Another object of my invention is to provide an automatic boring tool that can be configured for extreme accuracy for precision boring of critical holes.

Another object of my invention is to provide an automatic boring tool that can be configured for sufficient adjustment range such that it can be used for taper boring or thread chasing when controlled simultaneously with the Z axis of the machining center.

Another object of my invention is to provide cutting tool stability by preloading all operating mechanisms in the boring tool operating body.

Another object of invention is to provide a variety of spindle mounted probing devices having the means to operate the position sensitive encoder or transducer for sensing the location of objects while being moved relative to those objects in the plus or minus Z direction or in the X or Y direction.

Another object of my invention is to provide a spindle mounted probing system that is able to inspect the contour of the work surface by moving the workpiece or spindle with the same part shape program used to generate the workpiece.

Another object of my invention is to provide a spindle mounted probing system capable of defining the contour of a work surface parallel to the spindle center line.

Another object of my invention is to provide a spindle mounted probing system capable of defining the countour of a work surface in a plane perpendicular to the spindle center line.

Another object of my invention is to have the probe stylus constantly parallel to the spindle center and thus avoid any negative affect or probing accuracy due to stylus length.

Another object of my invention is to provide a probing device having preloaded antifriction operating mechanisms.

Another object of my invention is to provide a mechanical probe stylus mounting device that has uniform triggering travels regardless of sylus deflection direction.

Another object of my invention is to provide a probing system capable of sending a trigger signal to a position detection circuit in the machine CNC the instant the probe contact the work surface.

Another object of my invention is to provide a probing syste capable of controlling the machine axis traverse rate in order to decelerate from a rapid traverse rate to an absolute position.

Another object of my invention is to provide a probing system capable of tracking the deceleration distance of the machine axis after the stylus contacts the work surface.

Another object of my invention is to provide a spindle mounted combination boring tool arranged with a probing stylus and cutting tool mounted to the same boring head.

Another object of my invention is to provide a spindle mounted combination boring tool with a means of measuring the diameter of a just completed bored hole and automatically adjust for error without removing the boring tool from the spindle.

Another object of my invention is to provide a spindle mounted combination boring tool with a means of measuring the diameter of a just completed bored hole and automatically adjust for error without removing the boring tool from the spindle and without moving the center of the tool relative to the center of the bored hole.

Another object of my invention is to provide a spindle mounted combination boring tool having a means to operate the position sensitive encoder or transducer for sensing the location of and measuring the inside diameter of bored holes with the stylus mounted to the boring head.

Another object of my invention is to control a combination boring tool adjustment by means of a tool control rod in the machining center spindle.

Another object of my invention is to configure all of spindle mounted devices to operate with standard automatic tool changers.

Another object of my invention is to provide a coolant passage through the spindle control rod to permit the use of coolant fed tools.

SURFACE SENSING TOOL

In CNC machining centers, non-telescoping tool holders are used in conjunction with an "R" plane setting and thereafter cycling to the "R" plane setting, and measuring the distance from the tool point to the work surface and manually adjusting the tool length for each tool used. Alternatively, manually preset tools are employed. Another method is to utilize spindle and table probe cycles which are time consuming and expensive.

In previous telescoping tool adapters as described in U.S. Pat. No. 4,579,487 dated Apr. 1, 1986 it was necessary to use an integral mounted torque arm to work in conjunction with a machine mounted transducer.

To overcome these economic disadvantages, I have provided the use of telescoping tool holders for milling, drilling and tapping which consists of an adapter having a tool body arranged to be retained in the taper of the machine spindle. A spring-loaded sliding tool holder is fitted to the bore of the tool body, driven by a sliding key and retained by stop blocks. A tool actuating rod is secured to the sliding tool holder and extends through the center of the tool body and retension knob that is used to operate with the power tool locks in standard machining center spindles. The tool actuating rod establishes contact with a spindle control rod that operates through the center of the spindle and power tool lock mechanism.

The spindle control rod is rotatably connected to a sliding element. The position and force on the sliding element is controlled by the machining center CNC by means of a position sensitive encoder or transducer in combination with a linear electric servo motor. In operation the servo motor retracts the spindle control rod until after the spindle power tool lock has the tooling devices securely retained in the spindle taper. At this point the spindle control rod is advanced by the servo motor with a reduced current level until it contacts the tool actuation rod. The position of the encoder is processed by the machine CNC to establish a "0" set point and to verify tool presence and type of tool in the spindle. Each type of tooling device has its unique initial position.

DRILLING

A variety of tool adapters can be used to accommodate the type of machining required for drilling operations with a machining center, a tool adapter arranged with a collet type tool holder is generally used. The collet assembly is mounted in the sliding tool holder.

In the drilling operation the spindle tool adapter is moved to the work surface at a rapid traverse rate by the Z axis until the drill contacts the work surface. At this point, the drill stops advancing, but the spindle axis continues to move toward the work surface. This causes the tool holder to telescope into the tool body which in turn causes the tool actuating rod to move the spindle control rod and sliding element relative to the spindle gage line. This telescoping motion is able to overcome the controlled low force on the servo motor and displace the encoder. The encoder displacement as measured from the tool verification point is processed by the machine CNC which decelerates the Z axis in a predetermined distance to zero velocity. The distance traveled is the same as the travel of the telescoping tool holder, seating it solidly in the adapter body. When the predetermined transducer position is reached the machine CNC will offset the Z axis at this point and will immediately feed the drill or Z axis at a programmed feed rate to a programmed depth from the offset point which is the work surface. At the programmed depth, the spindle will retract to a point that brings the tool clear of the work surface if another hole is to be drilled or the spindle will retract to a tool change position if another tool is required.

If the drill breaks before the programmed dept is reached the spring-loaded tool holder will unseat in the adapter body. This action will cause the tool actuating rod to move with the tool holder, in turn the low force on the linear servo motor will displace the spindle control rod causing the sliding element to move and the transducer to be displaced from its predetermined position, signaling the machine CNC that a malfunction has occurred.

In advanced CNC logic, the initial surfaces location position can be put in memory. This information can be used to determine if a drill was broken on a previous operation but went undetected. If the drill was broken, the surface location position of the new cycle would be different than that with a full length drill. This difference in position will signal the machine CNC that a malfunction has occurred.

If broken tool detection is not required, then this same logic and tool adapter action can be used to sense when a drill has broken through the workpiece thickness. This may be the case when using larger diameter drills for drilling through holes from irregular surfaces of large castings or weldments.

TAPPING

For tapping operations, a telescoping tool adapter similar to the one for drilling is used, the difference being in the construction of the sliding holder. Instead of a collet holder, a conventional tap driver is used. The tap device can be either torque limiting or not.

In operation, the spindle tool adapter is moved to the work surface at a rapid traverse rate by the Z axis until the nonrotating tap contacts the work surface. At this point, the tap stops advancing, but the spindle axis continues to move toward the work surface. This causes the tool holder to telescope into the tool body which in turn causes the tool actuating rod to move the spindle control rod and sliding element relative to the spindle gage line. This telescoping motion is able to overcome the controlled low force on the servo motor and displace the encoder. The encoder displacement is processed by the machine CNC which decelerates the Z axis in a predetermined distance to zero velocity. The distance traveled is one half the telescoping travel of the tool holder. When the predetermined transduce position is reached the machine CNC will offset the Z axis at this point and will cause the spindle to rotate at a programmed speed. The tool holder spring pressure and the controlled low force from the servo motor through the control rod will cause the tap to feed into the workpiece. As the tap feeds into the workpiece, the encoder is displaced from its predetermined position, this displacement will signal the machine CNC to feed the spindle or Z axis into the workpiece at the rate the tap is advancing, the amount of displacement is determined by the following error of the Z axis servo system.

The control will track the position of the spindle axis and, at a depth programmed from the work surface, which was established when the predetermined transducer position was reached, the spindle will be reversed. The tap will then cause the tool to telescope into the tool adapter, which will cause the encoder to be displaced to the other side of its predetermined position. In this case the transducer signal will cause the Z axis to retract or move away from the work surface. It will continue to retract until the tap clears the work surface if another hole is to be tapped, or the spindle will retract to a tool change position if another tool is required.

If when using a non-torque limit tap driver, the tap should break before the programmed depth is reached, two possible events may take place.

If the tap disintegrates and a large position of the tap length is thrown clear, the spring-loaded tool holder will move rapidly away from the previous position and the encoder will move a like amount from its predetermined position. If there is no portion of the tap thrown clear, the spindle axis will continue to advance slightly until the encoder reaches its predetermined position, because a broken tap will not advance into the work.

In either case, the encoder will signal the machine CNC that an improper encoder position is present and that a malfunction has occurred.

If when using the torque-limiting tap driver the tap becomes dull, the tap driver will stall and the tap will stop advancing before the programmed depth is reached. This will cause the spindle axis to advance slightly until the encoder reaches its predetermined position. The encoder will signal the machine CNC that an improper encoder position is present and that a malfunction has occurred.

If a previous machining operation, a hole for the tap to enter had not been drilled, the tap cannot begin to feed into the workpiece after the surface location cycle. After an appropriate amount of time, the machine CNC will recognize that the encoder is still in its predetermined position and will signal a malfunction.

In advanced CNC logic, the initial surface location position can be put in memory. This information can be used to determine if a tap was broken on a previous operation, but went undetected. If the tap was broken, the surface location position of the new cycle would be different than that with a full length tap. This difference in position will signal the machine CNC that a malfunction has occurred.

MILLING

For milling operations, a telescoping tool adapter similar to one used for drilling is used, the difference being the milling adapter is arranged to stay in telescoped or compressed state during milling. The tool holder portion of the adapter is also arranged to mount various types of milling cutters or, in some cases single point fly cutters.

In operation after the tool adapter is locked in the spindle taper by the power tool lock and the spindle control rod is advanced until it contacts the tool actuation rod for tool verification, the current to servo motor is increased a controlled amount until there is sufficient thrust on the tool actuating rod to overcome a locking cam spring in the milling adapter. This thrust will move a locking cam a short distance to a positive stop. The position of the encoder is then processed by the machine CNC to varify locking cam release and established a point from which to measure tool holder travel. The spindle tool adapter is then moved to the work surface at a rapid rate by the Z axis until the non-rotating milling cutter contacts the work surface. At this point the cutter stops advancing, but the spindle axis continues to move toward the work surface. This causes the tool holder to telescope into the tool body which in turn causes the tool actuating rod to move the spindle control rod and sliding element relative to the spindle gage line. This telescoping motion is able to overcome the controlled low force on the servo motor and displace the encoder. The encoder displacement is processed by the machine CNC which decelerates the Z axis in a predetermined distance to zero velocity. The distance traveled is the same as the travel of the telescoping tool holder, seating it solidly in the tool body. The lower portion of the tool holder outside diameter has a self releasing taper which is seated in a matching inside diameter taper of the tool body for milling rigidly. When the predetermined transducer position is reached, the machine CNC will affect the Z axis at this point and reduce the current to the control rod servo motor allowing the locking cam spring to move a locking cam to a locking position. The tool holder is locked rigidly in the seated position by a series of balls located in a series of holes in the tool holder working in conjunction with cam surface on the inside diameter of the tool body and outside diameter of movable locking cam operating in the tool holder. The series of holes for the locking balls are located at the upper end of the tool holder and are machined at an angle less than 90° from the adapter center line. The locking balls are then able to rigidly support the upper end of the tool holder radially while rigidly seating it in the lower taper.

After the Z axis is offset and the milling adapter is locked-up the machine CNC will immediately start spindle rotation and feed the required axis to perform a milling operation measured from the surface of the workpiece.

When the milling operation is complete, the spindle axis is returned to the tool change position. At this time, if it is desirable to use the milling cutter in locked position, the adapter can be stored in the automatic tool change magazine. If, however, a surface sense cycle is required the next time, the adapter can be reset by increasing the current to the control rod servo motor. This will move the locking cam and compress the locking cam spring allowing the locking balls to move out of the internal cam groove if the tool body. The thrust of the servo motor and the force from the adapter spring will reset the tool holder to its normal sufface sensing position.

BORING

In machine tools—manually adjusted boring tools are normally used. These are usually preset or set at the machine by the operator by using dial bore gages or other measuring devices. If the hole diameter size exceeds the tolerance band, then another manual setting procedure is employed. In some cases when automatically adjustable tools are used, it is necessary to adjust them in increments by using external devices during a cycle interruption procedure. Other automatically adjustable boring bars do not have sufficient range of adjustment to machine various contours, or their actuating device is extremely large and expensive. Some of the automatic adjustable tools can not be handled by the machine automatic tool changer.

In previous automatic boring tools as described in U.S. Pat. No. 4,612,831 dated Sept. 23, 1986 it was necessary to have an integral mounted torque arm to work in conjunction with a machine mounted servo driven actuating unit.

To overcome these performance and economic disadvantages I have provided an automatic boring tool consisting of a main operating body fitted with a retension knob and arranged to be retained in the tape of the machine spindle by means of a power tool lock. A spring preloads the operating mechanism of a pivot mounted boring bar. The boring bar is adjusted by means of a cam bar that is integral with a portion of the boring bar that is opposite the cutting tool. The pivot point is located between the cam bar and cutting tool. The position of the cam bar about the pivot point is established by the position of a linear cam slidably mounted in the main operating body. The linear cam is secured to and held in a fully retracted position by a spring loaded tool actuating rod passing through the main operating body and retention knob. In operation the position of the actuating rod and linear cam is established by the position of the spindle control rod under the control of the machine CNC as previously described. The spring force on the tool actuating rod acts in the opposite direction of the force from the spindle control rod, therefore contact between the two rods are maintained under all operating conditions. As the linear cam changes position the cam bar motion about the boring bar pivot causes the boring bar to tilt to a controlled angle. This motion effectively moves or adjusts the location of the boring tool to increase or decrease the size of the hole being bored. While under operating conditions the current to the linear servo motor controlling the position of the spindle control rod is monitored to verify that contact between the spindle control rod and the spring loaded tool actuating rod is maintained.

OPERATION

The main operating body of the boring tool is fitted with a slidably mounted linear cam having a very gradual cam surface. The angle of the cam surface versus the "length ratio" of the pivot mounted boring bar determines the accuracy and increment of adjustment that can be made during boring. The "length ratio" of the bar is the distance from the cam bar to the pivot point divided by the distance from the pivot point to the tool tip. For precision boring, a selected cam angle may provide for 0.00001" tool tip motion for each 0.0001" motion of the servo controlled spindle control rod, and since the resolution for servo controlled devices is normally 0.0001" or less a very fine adjustment can be made.

The selected bar will not only have the proper "length ratio" but also have the correct length and diameter to accomplish the desired boring operation. It should be noted that this design allows for boring holes over a large range of diameters and lengths.

After the selection and assembly of the correct linear cam, boring bar and tool, the linear cam is positioned in its fully retracted position by the spring loaded tool actuating rod. This position provides the smallest diameter the boring tool will machine. At this point the tool is usually preset with gages to the mean of the tolerance permitted. The tool is then either manually loaded or inserted by the machine automatic tool changer into the machine spindle. Prior to this the spindle control rod is fully retracted. After the boring tool is secured in the spindle taper by the spindle power tool lock acting on the tool retention knob, the control rod is advanced by the servo motor with a reduced current level until it contacts the tool actuating rod. The position of the encoder is processed by the machine CNC, to verify tool presence and type of tool in spindle and to establish an "0" set point.

During operation the hole is bored and subsequently inspected by either a machine mounted probe or an off the machine inspection instrument. In the event the hole diameter falls below tolerance an adjustment is made by the servo controlled spindle control rod moving the tool actuating rod and linear cam which causes the preloaded cam bar acting on the cam surface to pivot the boring bar. The amount of adjustment is the result of probe or inspection instrument information being processed by the machine CNC. This process can be repeated at programmed intervals until the production run is complete.

For contouring and threading operations, the main operating body of the boring tool is generally fitted with a linear cam having a larger cam angle than one used for fine boring. The motion of the cam will cause a larger displacement of the tool tip for the "length ratio" of the selected bar. This increased tool tip motion allows for a broader range of contouring and threading. The accuracy required for these operations are generally not as great as for fine boring.

This type of tool is preset in the same manner as the fine boring tool previously described.

During contouring operations the servo driven spindle control rod may be constantly changing position as the bar is fed into the hole by the spindle or Z axis. The rate of change of the spindle control rod position versus the rate of change of the Z axis position determines the shape of the contoured hole.

PROBING

In present probing systems the output of the stylus deflection device is a discreet trigger signal. The amount of stylus pre-travel deflection is directionally sensitive due to the lobing effect of a three point support.

The present probing systems require a dedicated machine mounted inductive receiver, receiving signals from a complex switching arrangement internal to the probe head, or a more complicated probing head having not only a complex switching arrangement, but also other devices using centrifical switches and/or infra-red signals or the like to indicate to a machine mounted receiver that the stylus mechanism has been triggered.

The present probing systems are not capable of sending signals proportional to stylus deflection or controlling the rate of axis deceleration to discreet null position for triggering the machine axis location.

In previous probing devices as described in patent application Ser. No. 001,801 filed Jan. 2, 1987 it was necessary to use an integral mounted torque arm to work in conjunction with a machine mounted transducer unit.

To overcome these and other disadvantages I have provided a probing system arranged to work in conjunction with a common machine mounted encoder or transducer that is actuated by means of a control rod through the center of the spindle.

I provide probing devices consisting of a main support body retained in the taper of the machine spindle. The stylus is retained in a spring loaded operating head supported by an anti-friction slide arrangement mounted to the main support body.

If the probe is to be used only for locating surface perpendicular to the spindle centerline, then the stylus deflection is limited to motion parallel to the spindle centerline.

If the probe is to be used only for locating surface parallel to the centerline of the spindle then the stylus deflection is limited to motion perpendicular to the spindle centerline.

If the probe is to be used for locating surface perpendicular and parallel to the spindle line or angular surface, then the spring load operating head is mounted to permit stylus deflection from any angle.

In all cases the stylus is spring biased to a neutral position. The neutral position establishes the offset point of the encoder after the probing device has been inserted in the spindle taper and secured by the spindle power tool lock. The encoder is offset after the spindle control rod, which had been retracted prior to probe insertion, is advanced by the linear servo motor with a reduced current level until it contacts the actuation rod of the probe device. This position of the encoder is processed by the machine CNC to also verify tool presence and type of tool in the spindle. Each type of tool or probe has its own unique initial position.

The support body of the probing device houses a ball spline bushing retained by an end cap. A center shaft with external splines, ground for a preload fit, slides effortlessly in the ball bushing. The center shaft is secured to a tool actuating rod. A spring or combination of springs determine a positive neutral location of the actuating rod and center shaft assembly. The center shaft either directly or through an antifriction mechanism provides a positive neutral position of the probe stylus.

In a probing device arranged for stylus deflection parallel to the probe centerline, a stylus mounting head is secured to the spring biased center shaft.

During a probing cycle the spindle mounted probing device is moved to the work surface at a rapid traverse rate by the Z axis until the stylus contacts the work surface. At this point the stylus stops advancing, but the spindle axis continues to move toward the work surface. This causes the center shaft and mounting head to telescope into the support body, which in turn causes the tool actuating rod to move the spindle control rod and sliding element relative to the spindle gage line. This telescoping motion is able to overcome the controlled low force on the linear servo motor and displace the encoder.

The encoder displacement will cause a signal to be sent to the machine CNC the instant the probe contacts the work surface. The step function signal produced is used to trigger the probe compatible logic in the CNC and the sequence generally requires an axis reversal motion at a lower feed rate to read the probe system output and position location as the stylus leaves the work surface.

Alternately if the probe sequence uses the proportional signal, then the displacement of the encoder will signal the feed rate control circuit of the CNC to gradually reduce the feed rate to zero to a programmed position of the transducer in a distance necessary for normal deceleration. At the programmed position a trigger signal will be sent to the position detector logic in the CNC. The transducer position is algebrically added to the axis position to determine work surface location.

Another method of using the proportional signal is to have the displacement of the transducer slider signal the feed rate control circuit of the CNC to reduce the feed rate to "0" in a distance necessary for normal deceleration. The CNC will then algebracally add the transducer slider displacement to the machine axis position to determine the exact point the stylus contacted the work surface.

The controlled deceleration permitting zero feed rate produce an accurate work surface locating sequence.

When surface flatness is to be defined the spindle is advanced toward the workpiece until the stylus contacts the work surface. The spindle is then positioned in relation to the work surface an amount that allows the stylus to be axially displaced a fixed amount from the stylus neutral position. The workpiece is then moved in relation to the spindle in a plane perpendicular to the spindle center line. Any surface deviation from a true flat plane will cause the stylus to move axially causing the transducer slider to be displaced from the previously defined fixed location from the neutral position. The axial movement caused by surface deviation will be read by the CNC from the electronic variable displacement transducer.

If the work surface is contoured and the contour was generated by a three axis machine, then the surface can be inspected in a similar manner. The work surface is defined by using a part program to control the motion of the three axis and reading the deviation by the amount of transducer displacement. Another method would be to move the workpiece in a plane perpendicular to the spindle center line with the spindle fully retracted. At given coordinates of workpiece location the spindle is advanced until the stylus contacts the work surface. The spindle is then retracted a programmed amount sufficient for the stylus to clear the surface and the workpiece is moved to a different coordinate.

Using the method where the deviations are continuously read by the CNC from the transducer output produces a more complete and accurate work surface definition.

In a probing device arranged for stylus deflection perpendicular to the spindle center line, the stylus mounting head assembly is secured to the face of the support body and consist of a stylus mounting head located and supported between two parallel surfaces perpendicular to the spindle center line by means of precision preload antifriction ball bearings. The ball bearings are retained in a spacer ring and since they contact flat surfaces they permit the stylus head to move freely parallel to the mounting surfaces. The stylus head engages an orientation device designed to allow the above motion but prevents the head from rotating thus preventing any deviation in reading errors as the stylus contacts the work surface. The stylus head has a precision 90° tapered hole located in the surface opposite the stylus.

A precision ball operates in the tapered hole. A center shaft also has a precision 90° tapered hole on one end that also operates on the same ball. The center shaft is supported by a ball bushing. The opposite end of the center shaft is secured to the tool actuating rod. The center shaft and tool actuating rod assembly are spring loaded so the tapered hole on the center shaft operating against the ball opposite the tapered hole in the stylus head will cause the stylus head to seek a neutral position along a plane perpendicular to the stylus center line.

Any deflection of the stylus in this plane will move the stylus head on its antifriction ball mounting causing the ball operating between the tapered holes in the stylus head and the tapered holes in the center shaft to roll along the side of the tapered holes of both members. The resultant side force on the center shaft is supported by the ball bushing, therefore, all movements necessary to translate the side force against the stylus to an axial force parallel to the stylus is completely friction free. The resultant axial force will cause the center shaft to move axially along this ball spline shaft and the stylus will remain parallel to the neutral position when deflected along a plane perpendicular to the probe center line.

Another configuration of the probing device is constructed similar to the above, which permits the stylus to move axially in relation to the support body carrying the stylus head. This axial motion is also spring loaded and will cause the stylus to seek a neutral position in three directions. The stylus mounting head is supported in a step tapered hole when it is in its axially neutral position. The taper is steep enough to give rigid support with no side play, but is self releasing along its center line.

When it is required to locate the upper and lower surfaces of a workpiece in planes perpendicular to the spindle center line, a pair of opposing springs acting against positive locating shoulder are used to establish a neutral position of the stylus mounting head. A stylus configured for contecting either the upper or lower surface is secured to the mounting head.

COMBINATION PROBE-BORING TOOL

In cases of boring extremely accurate holes it is desirable to inspect the hole diameter before the part is removed from the machine work table or preferably before the boring tool is removed from the spindle or even before the spindle is moved relative to the center of the hole. Ideally the hole is bored, inspected and rebored to correct any error without removing the tool from the spindle or the spindle moved relative to the center of the hole.

When standard boring tools or the automatic type previously described are used in automatic machining centers, it is necessary to remove the boring tool from the spindle in order to insert a probing device to inspect the hole diameter. It is also necessary to move the spindle relative to the center of the hole. It is well known in the art of fine boring that removal and reinsertion of the boring tool can contribute to hole size variances and that the repeatability tolerances in the position of machine center axis can contribute to hole location variances.

To overcome the limitations of convention boring and inspection devices, I have provided an automatic boring tool and probe combination that is capable of performing the ideal bore, probe, bore cycle. This combination tool consists of a main operating body fitted with a retention knob and arranged to be retained in the taper of the machine spindle by means of a power tool lock. A spring preloads the operating mechanism of a pivot mounted boring bar. The boring bar is adjusted by means of a cam bar that is integral with a portion of the boring bar that is opposite the cutting tool. The pivot point is located between the cam bar and the cutting tool. A boring head that is either integral with or mounted to the boring bar provides an adjustable mounting for the cutting tool. An adjustable mounting for the probe stylus is also provided for in the boring head. The position of the cam bar about the pivot point is established by the position of a linear ca slidably mounted in the main operating body. Two distinct but connecting cam surfaces exist in the linear cam. One surface has a very gradual slope for tool adjustment, the other surface is a steeper slope angled opposite the first slope and is used for the probing cycle. The linear cam is secured to and held in a fully retracted position by a spring loaded tool actuating rod passing through the main operating body and retention knob. In operation the position of the actuating rod and linear cam is established by the position of the spindle control rod under the control of the machine CNC as previously described. The spring force on the tool actuating rod acts in the opposite direction of the force from the spindle control rod, therefore contact between the two rods are maintained under all boring conditions. As the linear cam changes position the cam bar motion about the boring bar pivot point causes the boring bar to tilt to a controlled angle. This motion effectively moves or adjusts the location of the boring tool to increase or decrease the size of the hole being bored. While under operating condition the current to the linear servo motor controlling the position of the spindle control rod is monitered to verify that contact between the spindle control rod and the spring loaded tool actuating rod is maintained.

BORING OPERATION

The main operating body of the boring tool is fitted with a slidably mounted linear cam having a very gradual cam surface. The angle of the can surface versus the "length ratio" of the pivot mounted boring bar determines the accuracy and increment of adjustment that can be made during boring. The "length ratio" of the bar is the distance from the cam bar to the pivot point divided by the distance from the pivot point to the tool tip. For precision boring a selected cam angle may provide for 0.00001" too tip motion for each 0.0001" motion of the servo controlled spindle control rod and since the resolution for servo controlled device is normally 0.00001" or less a very fine adjustment can be made.

The selected bar will not only have the proper "length ratio" but also have the correct length and diameter to accomplish the desired boring operation. It should be noted that this design allows for boring holes over a large range of diameters and lengths.

After the selection and assembly of the correct linear cam, boring bar and tool the linear cam is positioned in its fully retracted position by the spring loaded tool actuating rod. This position provides the smallest diameter the boring tool will machine. At this point the tool is then either manually loaded or inserted by the machine automatic tool changer into the machine spindle. Prior to this the spindle control rod is fully retracted. After the boring tool is secured in the spindle taper by the spindle power tool lock acting on the tool retention knob, the control rod is advanced by the servo motor with a reduced current level until it contacts the tool actuating rod. The position of the encoder is processed by the machine CNC to verify tool presence and type of tool in spindle and to establish a "0" set point.

After verification the hole is bored with boring tool settings as described.

INSPECTION OPERATION

After the hole is bored the combination boring tool is retracted from the hole and an inspection cycle is performed. It should be noted that the probe stylus setting is established prior to this by a calibration sequence using a certified ring gage having the same diameter as the hole to be bored. Two type of calibration cycles are described in later text.

With the combination boring tool clear of the hole, the spindle control rod advances the linear cam to a point where the cam bar is in contact with the steep slope position of the cam. This position of the cam locates both the cutting tool and the stylus so they will clear the diameter of the bored hole. After the combination tool is again advanced into the hole the linear cam is positioned to a point which allows the stylus to contact the inside diameter of the hole. The machine CNC then processes the encoder position and compares it to the position established during the calibration cycle. The linear cam is again positioned for the stylus and tool to clear the hole so the tool can be retracted.

In the event the hole diameter falls below tolerance an adjustment is made by the servo controlled spindle control rod moving the tool actuating rod and linear cam which causes the preloaded cam bar acting on the cam surface to pivot the boring bar. This amount of adjustment is the result of the probe cycle information being processed by the machine CNC. This process can be repeated at programmed intervals until the production run is completed. A more detailed description of the probing sequence appears in later text.

In the drawings, the same reference numerals are used throughout the several views and refer to the same parts, and the sectional views are taken looking in the direction of the arrows at the ends of the section lines.

Referring now to the drawings, I show:

FIG. 8 Is a section of the tool adapter portion of my invention similar to FIG. 7 that is arranged for milling with the adapter in a latched position.

FIG. 9 Is a section along line 9—9 of FIG. 8.

FIG. 10 Is a section of the boring tool portion of my invention also taken along line 5—5 of FIG. 2 similar to FIG. 5.

FIG. 11 Is a section along line 11 of FIG. 10.

FIG. 12 Is a section along line 12 of FIG. 10.

FIG. 17 Is a section of the probing device of my invention arranged for stylus deflection perpendicular and parallel to the probe center line also taken along line 5—5 of FIG. 2 similar to FIG. 5.

FIG. 18 Is an enlarged section of a portion of FIG. 17 showing ball and tapered hole detail.

Figure 1:
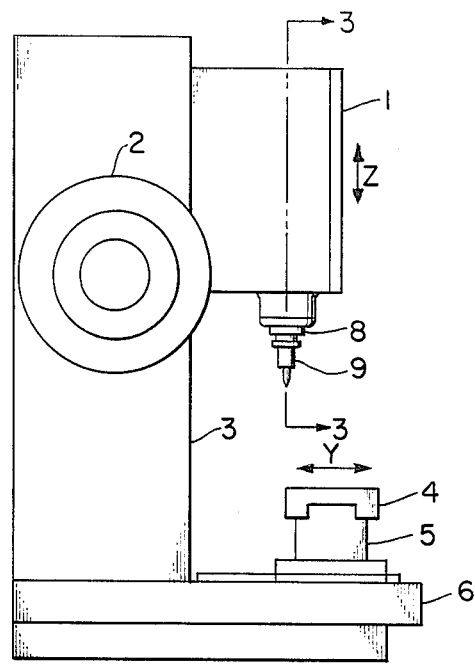
FIG. 1 Is a side elevation of machining center showing a typical device of my invention inserted in the spindle.
Figure 2:
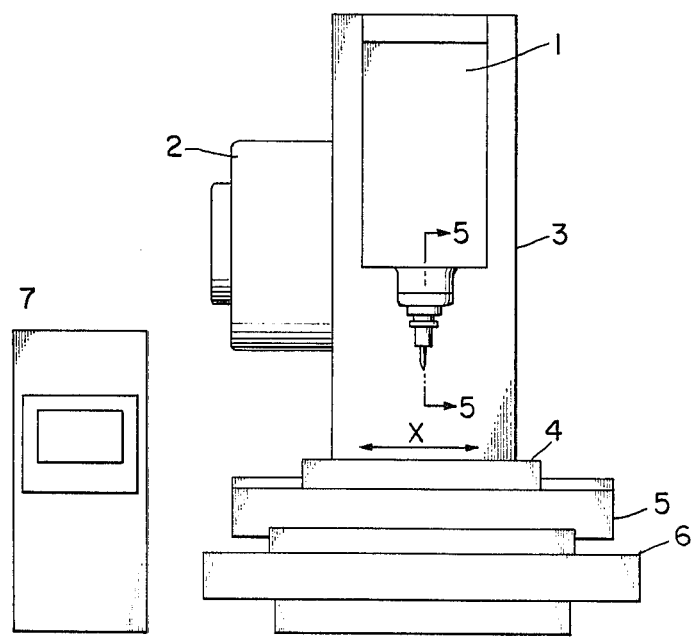
FIG. 2 Is a front elevation of a machine center.

Referring to the drawings I show in FIGS. 1 and 2 a vertical spindle machining center having a base 6 supporting a moving saddle 5. The saddle motion is referred to as the Y axis. The saddle supports the workholding table 4. The table motion is referred to as the X axis. The base 6 also supports the machine column 3. Mounted to column 3 is the automatic tool changer 2. Column 3 also provides a slidable mounting surface for the spindle headstock 1. The vertical motion of the headstock 1 is referred to as the Z axis. Computer numerical 7 control all functions of the machining center.

Figure 3:
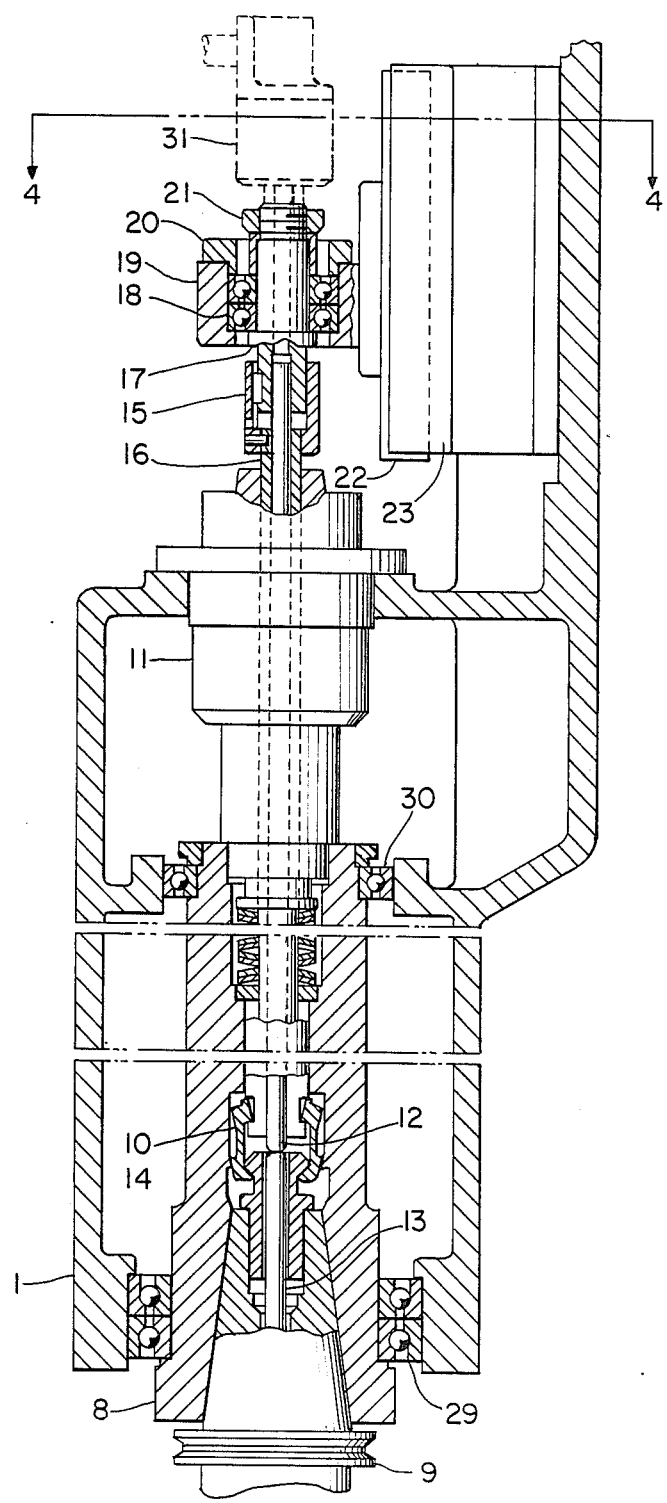
FIG. 3 Is a section of the spindle of a machining center arranged with my invention taken along the line 3—3 of FIG. 1.

Referring to FIG. 3 I show a section through the spindle of a typical machining center. Operating through the center of the spindle I show a spindle control rod 12 secured to rotating connecting shaft 17 supported in housing 19 on bearing 18. Bearing cap 20 clamps outer race of bearing 18 in housing 19, jam nut 21 clamps inner races of bearing 18 to connecting shaft 17. Spindle control rod 12 passes through a typical power tool lock mechanism indicated in part by retention collet 10 and operating mechanism 11. Tool lock center shaft 16 is secured to telescoping coupling 15 which allows axial motion to occur between the spindle control rod 12 and center shaft 16 but allows center shaft 16 to rotatably drive connecting shaft 17.

A typical tooling device 9 is supported in taper of spindle 8 and retained by knob 14 by means of power tool lock retention collet 10. Tool actuating rod 13 is in contact with spindle control rod 12. Referring to FIG.

4 I show housing 19 secured to sliding element 22 which controls the position of and force on control rod 12 (FIG. 3) by linear servo motor (25,26) and transducer (27,28) under the control of computer numerical control 7 (FIG. 2). Sliding element 22 is supported and guided on base 23 by preloaded antifriction bearing 24. If coolant through the tool is a requirement then connecting shaft 17 is modified to mount a rotary coolant coupling 31, spindle control rod 12 is also changed to a hollow tube to permit coolant flow into tool lock collet area occupied by retention collet 10.

SURFACE SENSE ADAPTER

Figure 5:
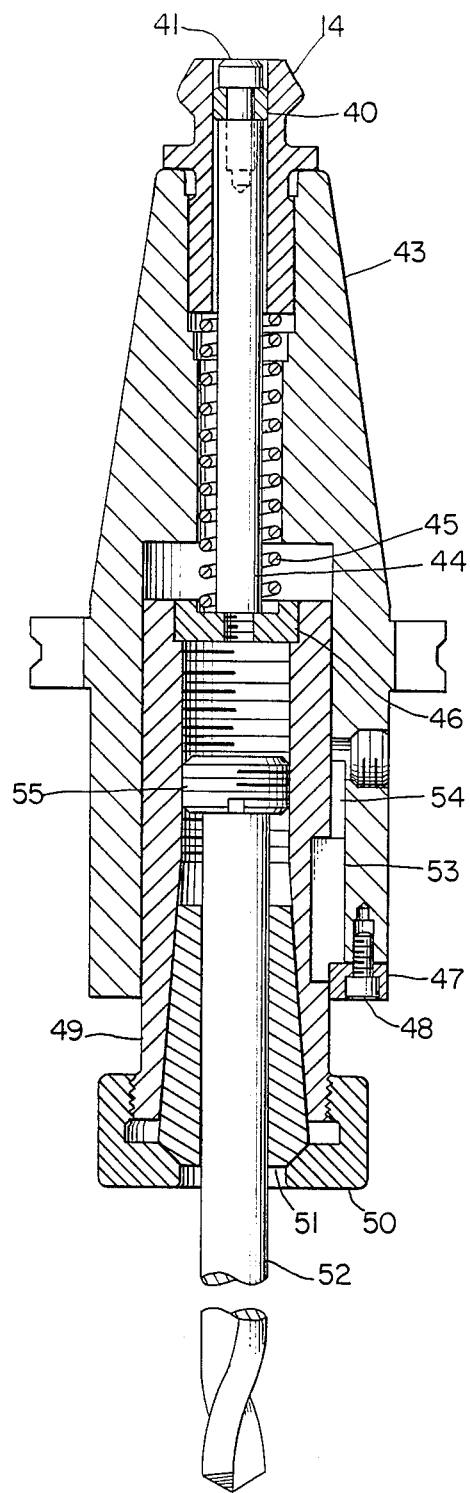
FIG. 5 Is a section of the tool adapter portion of my invention that is arranged for drilling taken along line 5—5 of FIG. 2.

Referring now to FIG. 5 I show a section through a telescoping tool adapter 9 arranged for drilling. The adapter comprises an adapter body 43 and retention knob 14. Slidably supported in body 43 is tool holder 49 driven by key 53 and retained by stop block 47 against pressure from spring 45. Tool actuating rod 44 is secured to tool holder 49 by tool holder plug 46. A drill 52 is clamped in collet 51 by collet lock nut unit 50. Fitting spacer 40 is secured to actuating rod 44 by spacer screw 41.

Figure 4:
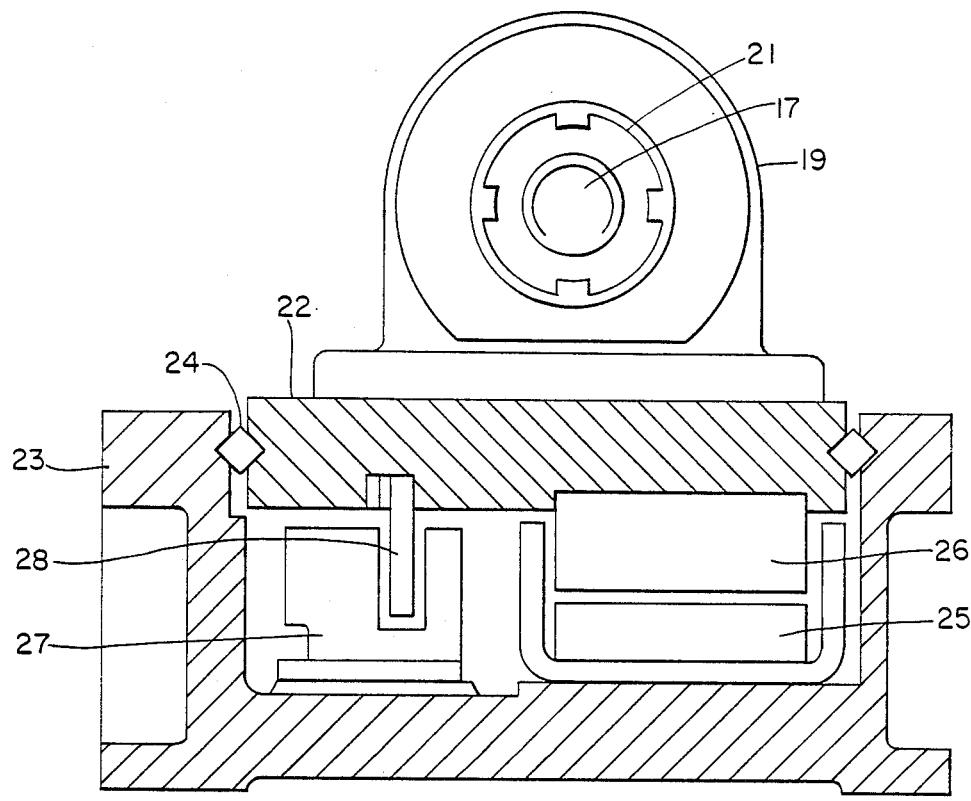
FIG. 4 Is a section of the transducer unit of my invention taken along line 4—4 of FIG. 3.

Before telescoping tool adapter 9 is inserted in spindle 8 control rod 12 (FIG. 3) is fully retracted by linear motor (25,26) FIG. 4. After insertion, linear motor (25,26) advances control rod 12 with a reduced current or low force until control rod 12 contacts spacer screw 14 of actuating rod 44 position of transducer (27,28) is processed by computer numerical control 7 to establish a "0" set point and to verify tool presence and type of tool. The type of tool is determined by the relationship of spacer screw 41 to the gage line of the taper of adapter body 43. "0" setting eliminates any inaccuracies due to thermal growth of spindle assembly components relative to length of spindle control rod 12.

During surface sensing drilling operation, the spindle 8 is advanced toward the workpiece until drill 52 contacts the worksurface. The spindle or Z axis will continue to advance, which will cause the tool holder 49 to telescope into adapter body 43 compressing spring 45. This motion will also cause tool actuating rod 44 to displace spindle control rod 12 and sliding element 22 (FIG. 3). Sliding element 22 will displace transducer (27,28) FIG. 4. The transducer displacement will cause computer control 7 (FIG. 2 and FIG. 27) to decelerate the Z axis to zero velocity in the distance it takes the end of the tool holder 49 to seat solidly in tool adapter body 43. At this point, the Z axis position is set to zero and will feed the drill 52 into the work to a depth measured from the work surface by the computer numerical control.

If the drill should break before the depth is reached, spring 45 will cause tool holder 45 to unseat in tool body 43, thereby allowing spindle control rod 12 and transducer (27,28) to be displaced. This motion will cause transducer (27,28) to send an error signal to the computer numerical control which will stop the cycle until the problem is corrected.

Figure 6:
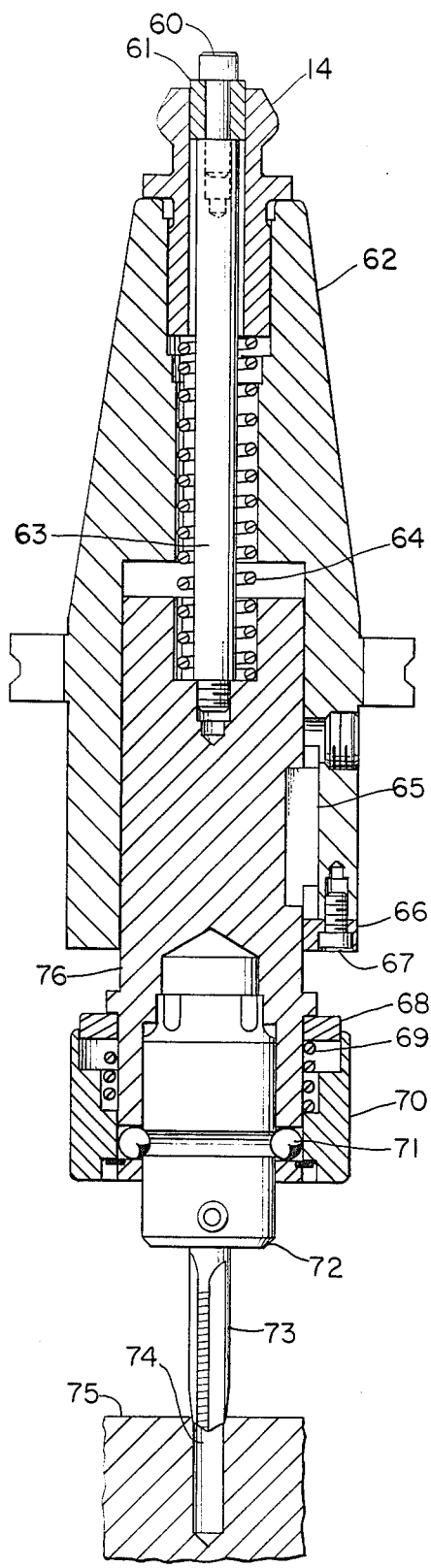
FIG. 6 Is a section of the tool adapter portion of my invention similar to FIG. 5 partially compressed that is arranged for tapping.

I now refer to FIG. 6, which shows a telescoping tool adapter 9 arranged for tapping. The adapter comprises an adapter body 62 and retention knob 14. Slidably supported in body 62 is tool holder 76. Tool holder 76 is driven by key 65 and retained by stop block 66 against pressure from spring 64. Tool actuating rod 63 is secured to tool holder 76. Fitting spacer 61 is secured to actuating rod 63 by spacer screw 60. Locked into tool holder 76 by detent balls 71, which are held in position by collet 70, is tap driver 72 of the direct drive type or of the torque limiting type, tap 73 is retained and driven by driver 72.

Before the telescoping tool adapter for tapping is inserted in the spindle, the control rod 12 is retracted, after insertions the control rod 12 is cycled the same way as described for the drilling adapter.

During surface sense tapping operation, the spindle 8 is advanced toward the workpiece 75 which has been prepared for tapping by having a previously machined hole 74 that is to be threaded by tap 73. Tap 73 is not rotating at this time. The spindle or Z azis will continue to advance, which will cause the tool holder 76 to telescope into adapter body 62 compressing tap thrust spring 64. The amount of spring pressure can be varied by changing the compression rate of spring 64 to suit the size of tap 73. This motion will also cause the tool actuating rod 63 to displace spindle control 12 and sliding element 22 (FIG. 3). Sliding element 22 will displace transducer (27,28) FIG. 4. The transducer will cause computer numerical control 7 (FIG. 2 and FIG. 27) to decelerate the Z axis to zero velocity in approximately half the travel the tool holder 76 has in the adapter body 62.

At this point the Z axis position is set to zero. The spindle will start to rotate and the pressure determined by spring 64 will cause the tap to feed into hole 74 to a depth measured from the work surface by the computer numerical control. The rate of feed is determined by the pitch of tap 73 and rotational speed of spindle 8.

As tap 73 moved into hole 74 the toolholder 76 will start to move out of adapter body 62. This will again cause spindle control rod 12 and transducer to be displaced causing computer numerical control to feed the spindle or Z axis at the same rate, but slightly behind tap 73.

When the proper tap depth is reached, the spindle will reverse, will cause the tap to back out of the hole. This action will push the tool holder 76 further into the adapter body 62 which will cause the transducer (27,28) to again be displaced. This motion signals the computer numerical control to reverse the motion of the Z axis, and the Z axis will follow the tap out of the hole until tap 73 is clear of the work surface.

If tap 73 should break before proper depth is reached, the tool holder 76 will advance very rapidly if a portion of the tap is thrown clear, or it will stop advancing because a broken tap will not continue feeding. In either case the transducer (27,28) will be displaced which will signal and out of synchronization condition to the computer numerical control, causing the cycle to stop until the problem has been corrected.

Figure 7:
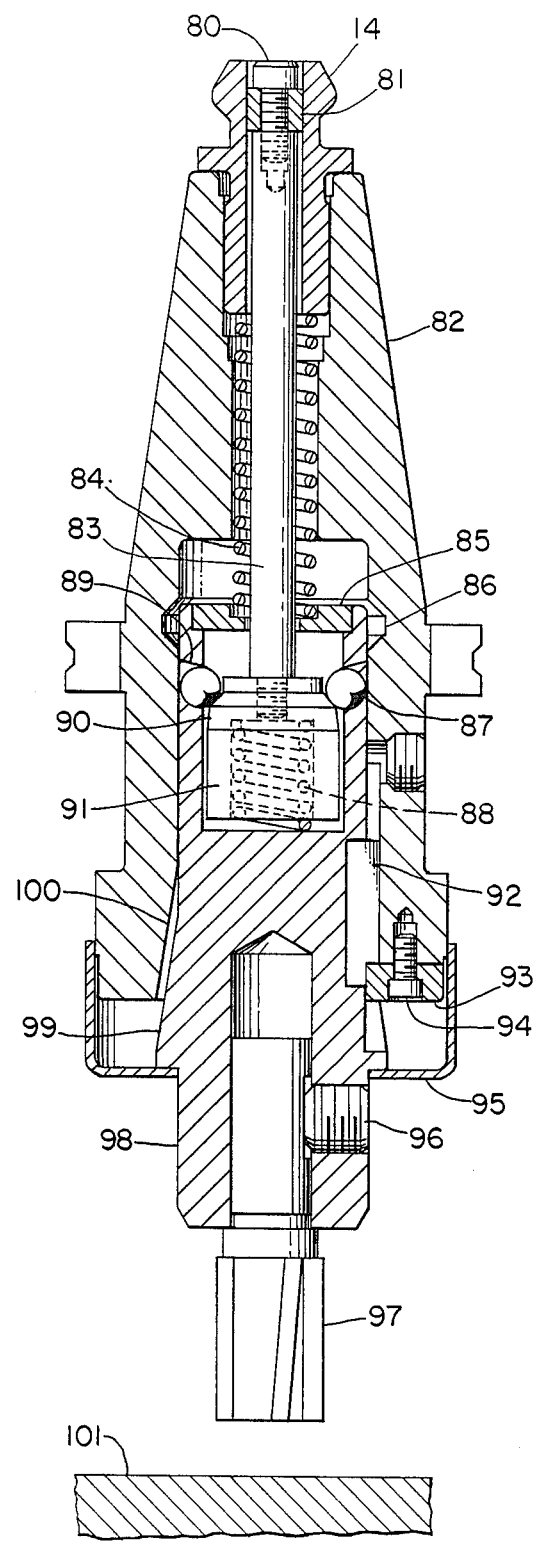
FIG. 7 Is a section of the tool adapter portion of my invention similar to FIG. 5 that is arranged for milling with the adapter extended.

I now refer to FIG. 7 which shows a section through a telescoping tool adapter 9 arranged for milling. The adapter comprises an adapter body 82 and retention knob 14. Slidably supported in adapter body 82 is tool holder 98 driven by key 92 and retained by stop block 93 against pressure from spring 84 acting against tool holder disc 85. Tool holder locking balls 87 work in conjunction with a cam groove 86 on inside diameter of adapter body 82 and a cam surface 90 on outside diameter of locking cam 91. Locking cam spring 88 maintains pressure on locking cam 91 and locking balls 87 during milling operation. Tool actuating rod 83 is secured to locking cam 91. Spacer screw 80 secures fitting spaces 81 to actuating rod 83. Milling cutter 97 is secured to tool holder 98 by lock screw 96. Chip guard 95 is attached to tool holder 98 to prevent debris from collecting on tool holder taper 99 and adapter body taper 100.

In FIG. 8, I show the same milling adapter as shown in FIG. 7 after it has been advanced by Z axis until the cutter 97 contacting work surface 101 telescopes the tool holder 98 into adapter body 82 until tool holder taper 99 is seated solidly into adapter body taper 100 and locking balls 87 working in a series of slight angled holes 89 in tool holder 98 have been cammed into a locking position in the inside diameter cam groove 87 of adapter body 82 by pressure from cam locking spring 88 against locking cam 91 having a cam surface 90 with a locking angle so negative cutting forces from some types of milling operation cannot unseat tool holder 82. Tool holder 98 is held radially rigid in adapter body 82 at lower end by taper surface 99 and 100 and at upper end by locking balls 87 operating in holes 99 which are machined at an angle less than 90° from the center line of tool holder body 98. This angle prevents any radial motion of the upper end of tool holder 98 when locking balls 87 are rigidly locked in cam groove 87 of adapter body 82 by locking cam angle 90 on locking cam 91.

In FIG. 9, I show a section through the series of holes 89 in tool holder 98 in which the locking balls 87 operate in conjunction with internal cam groove 86 of adapter body 82 and cam surface 90 of locking cam 91 to form a very rigid means of maintaining the tool holder 98 in a positive position in adapter body 82.

Before the telescoping tool adapter for milling is inserted in the spindle 8, spindle control rod 12 is retracted by linear motor (25,26) FIG. 4. After insertion linear motor (25,26) advances control rod 12 with a reduced current or low force until control rod 12 contacts spacer screw 80 of actuating rod 83, position of transducer (27,28) is processed by computer numerical control 7 (FIG. 2) to verify tool presence and type of tool. The type of tool is determined by the relationship of spacer screw 80 and the gage line of the taper of adapter body 82. After tool verification, the current to linear motor (25,26) is increased a controlled amount until there is sufficient thrust on tool actuating rod 83 to overcome force of cam locking spring 88. The thrust will move locking cam 91 against shoulder of tool holder 98. The position of transducer (27,28) is again processed by computer numerical control 7 to establish a "0" set point. Low current is maintained on linear motor (25,26) during a surface sensing operation.

During a surface sense milling operation, non-rotating spindle 8 is advanced toward the workpiece 101 until the milling cutter 97 contacts the work surface. The spindle or Z axis will continue to advance causing the tool holder 98 to telescope into adapter body 82 compressing spring 84. This motion is able to overcome the controlled low force on linear motor (25,26) and will also cause tool actuating rod 83 to displace spindle control rod 12 and sliding element 22 (FIG. 3). Sliding element 22 will displace transducer (27,28) FIG. 4. The transducer displacement will cause computer numerical control 7 (FIG. 2 and FIG. 27) to decelerate the Z axis to zero velocity in the distance it takes taper 99 of tool holder 98 to seat solidly in taper 100 of adapter body 82. Current to linear motor (25,26) is reduced to near zero which will allow locking cam spring 88 to move locking cam 90 to locking position seating tool holder 98 rigidly in adapter body 82. At this point the Z axis is set to "0" and the computer numerical control will start to rotate spindle 8 and feed the required axis to perform a milling operation measured from the surface of workpiece 101.

After the milling operation is complete the tool holder 98 is unlocked from the telescoped position by increasing the current to the linear motor (25,26) sufficiently to move locking cam 91 and compress the locking cam spring 88 allowing locking balls 87 to move out of cam groove 86 of adapter body 82. The thrust from linear motor (25,26) and therefore force spring 84 will reset the tool holder to its normal surface sensing position.

AUTOMATIC BORING TOOL

I now refer to FIG. 10 which shows a section through an automatic boring tool which consists of operating body 114 and retention knob 14. Operating body 114 is fitted with pivot block 118 to provide a support for pivot sleeve 122 and pivot locking stud 127. Boring bar 125 is guided in pivot block 118 and retained by pivot sleeve 122. Compressable seal 121 excludes debre from pivot block assembly. Preload springs 120 causes boring bar 125 to pivot around sleeve 122 forcing cam bar 117 secured to boring bar 125 against cam slot 131 in linear cam 115. Linear cam 115 is slidably mounted in operating body 114. Tool actuating rod 113 is secured to linear cam 115 and keeps linear cam 115 fully retracted by force from rod spring 112 acting against fitting spacer 111 secured to actuating rod 113 by spacer screw 110. Adjustable cutting tool cartridge 126 is mounted to boring bar 125. The position of cutting tool 126 is usually preset in a tool room environment.

Before the automatic boring tool is inserted in spindle 8, control rod 12 (FIG. 3) is fully retracted by linear motor (25,26) FIG. 4. After insertion linear motor (25,26) advances control rod 12 with a reduced current or low force until control rod 12 contacts spacer screw 110 of actuating rod 113 position of transducer (27,28) is processed by computer numerical control 7 to establish a "0" set point and to verify tool presence and type of tool. The type of tool is determined by the relationship of spacer screw 110 to the gage line of the taper of operating body 114. "0" setting eliminates any inaccuracies due to thermal growth of spindle assembly components relative to length of spindle control rod 12.

During production run of parts the hole being bored is measured by previously described means and an adjustment value is transmitted to the computer numerical control. The spindle control rod 12 is advanced by 1 linear motor (25,26). The amount of the extension is measured by linear transducer (27,28) and is determined by the cam angle of cam slot 131 of linear cam 115, and the "length ratio" of boring bar 125. As spindle control rod 12 is advanced, tool actuating rod 113 and linear cam 115 are advanced the same distance compressing spring 112. The motion of linear cam 115 and cam slot 131 causes cam bar 117 to rotate boring bar 112 about pivot sleeve 122. This rotation moves cutting tool 126 the correct distance necessary to compensate for tool wear. During the adjustment and machining operations preload springs 120 keep a positive load on boring bar 125 so no looseness can be present between boring bar 125, pivot sleeve 122, cam bar 117, linear cam 115 and bore in operating body 114.

In contouring operations linear servo motor (25,26) will advance and retract while headslide 1, FIG. 1 (Z axis) is being advanced. The phase relationship of these motions controlled by computer numerical control 7 determines the configuration of the contoured parts.

FIG. 11 is a section through cam bar 117 showing cam bar 117 having a press fit in boring bar 125 and slidably fit in linear cam 115. Linear cam 115 is fully supported in bored hole of operating body 114.

FIG. 12 is a section through pivot block 118 showing fit of boring bar width 125 in contoured internal shape of pivot block 118. Boring bar 125 pivots about sleeve 122. Shoulder spacer 128 is fitted to eliminate any end play between the internal dimension of pivot block 118 and width of boring bar 125. In normal machining practices, end play may occur, but by fitting spacer 128 and tensioning locking stud 127 by means of washer 130 and locking nuts 129 will cause a slight deflection in pivot block 118, thus eliminating end play. A section through preload springs 120 is also shown.

Figure 13:
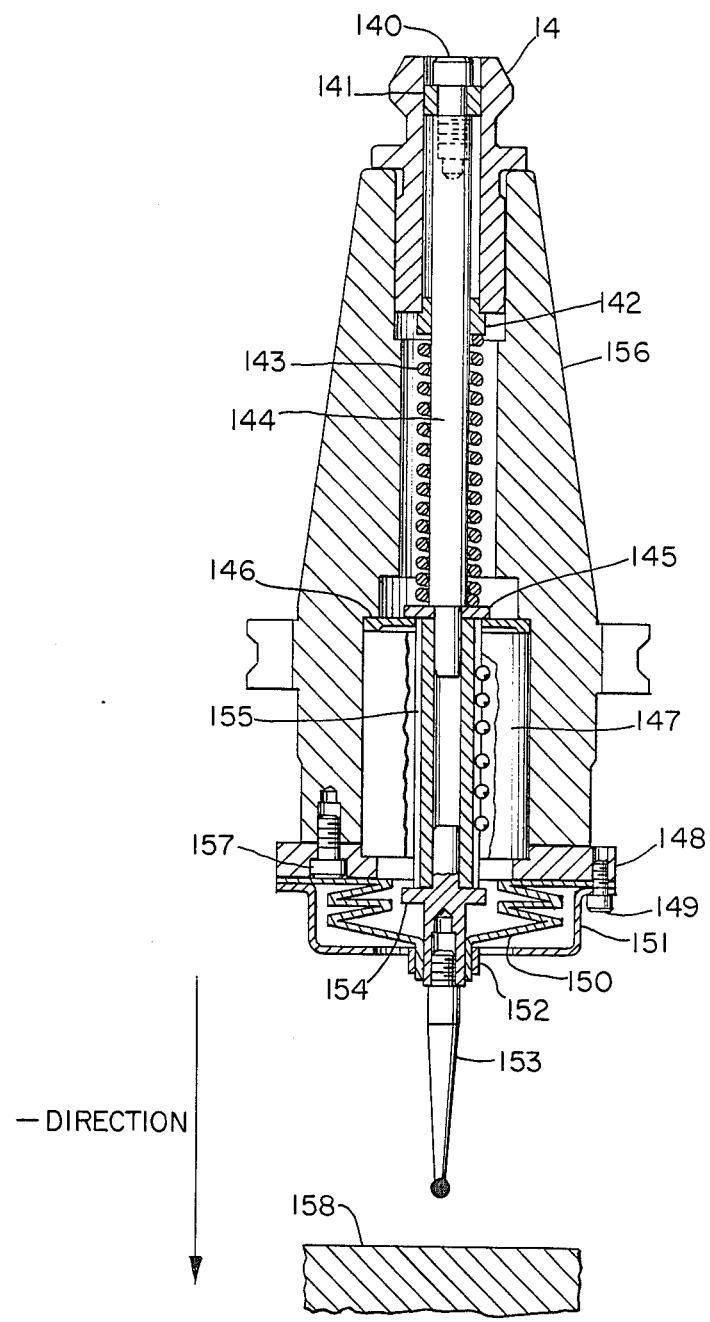
FIG. 13 Is a section of the probing device of my invention arranged for stylus deflection parallel to the probe center line also taken along line 5—5 of FIG. 2 similar to FIG. 5.

Referring to FIG. 13, I show a section through a probing device arranged for stylus deflection parallel to the probe center line. The probe device comprises a support body 156 and retention knob 14. Ball spline bushing 147 and shaftstop collar 146 are secured in bore of support body 156 by cap 148. Stylus 153 is secured to stylus mounting head 154. Center shaft 155 is supported in ball spline bushing 147 by external ground splines. Stylus mounting head 154 is secured to one end of center shaft 155. Tool actuating rods 144 and stop washer 145 are secured to the opposite end. Probe preload spring 143 is guided on actuating rod 144 and determines stylus neutral position by maintaining pressure between stop washer 145 and spring stop 142. Fitting spacer 141 is secured to actuating rod 144 by spacer screw 140. Bellows 150 and guard 151 provide protection to spline shaft 155.

Before any probing device is shown in FIGS. 13, 14, 15, 17 and 19 is inserted in spindle 80 control rod 12, (FIG. 3) is fully retracted by linear motor (25,26) FIG. 4. After insertion linear motor (25,26) advances control rod 12 with a reduced current or low force until control rod 12 contacts spacer screw of the appropriate tool actuating rod, position of transducer (27,28) is processed by computer numerical control 7 to establish a "0" set point and to verify tool presence and type of tool. The type of tool is determined by the relationship of the spacer screw to the gage line of the operating body. "0" setting eliminates any inaccuracies due to thermal growth of spindle assembly components relative to length of spindle control rod 12.

In operation the spindle 8 is advanced toward the workpiece 158 until stylus 153 contacts the work surface. The spindle or Z axis will continue to advance, which will cause the stylus 153, stylus mounting head 154, center shaft 155, and tool actuating rod 144 to move relative to support body 156 and spindle 8. This motion will also cause tool actuating rod 144 to displace spindle control rod 12 and sliding element 22 (FIG. 3). Sliding element 22 will displace transducer (27,28) FIG. 4. The transducer displacement will cause computer numerical control 7 (FIG. 2 and FIG. 27) to decelerate the Z axis to zero velocity.

Figure 27:
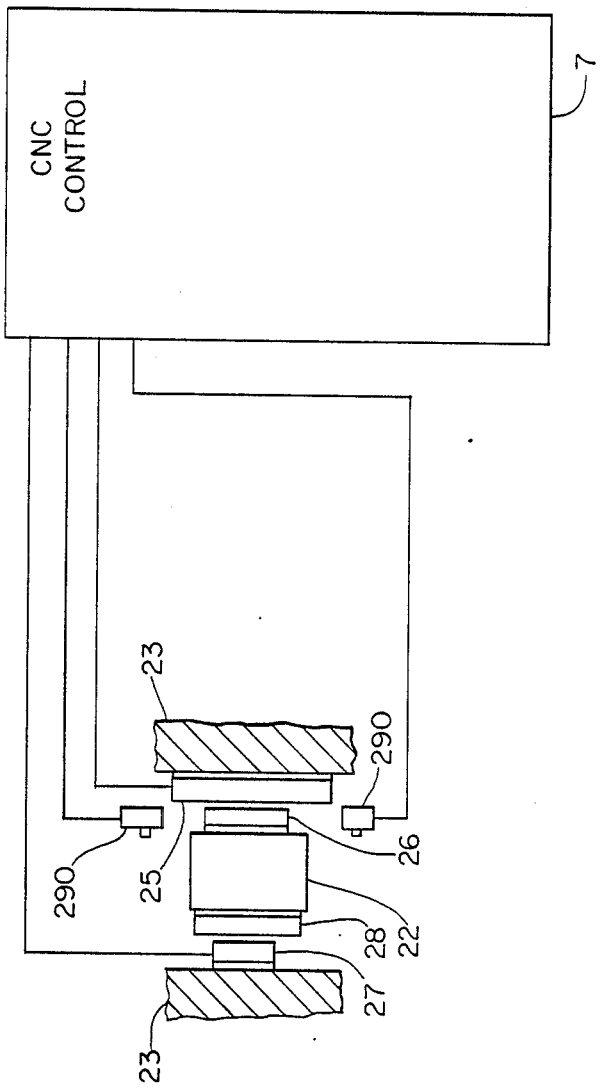
FIG. 27 is an electro mechanical schematic of my invention taken along line 27—27 of FIG. 26.

The displacement of transducer (27,28) FIG. 4 and FIG. 27 will signal computer numerical control 7—FIG. 2 and FIG. 27 the probe stylus 153 has contacted work surface 158. The CNC may use this signal in any of the following ways.

Since the transducer (27,28) is in a null or zero position prior to the probing cycle, the initial contact of stylus 153 against work surface 158 will put the transducer in an out of null condition. This signal triggers the probe compatibe circuits in the CNC which are designed to use the signal for axis position location. In this mode the spindle axis will overshoot and reverse its direction at a lower feed rate and again signal a null condition as stylus 153 leaves worksurface 158. This final null signal is used to establish axis position. Previous calibrations will then be used to calculate actual work surface location.

An alternate method is to have the CNC 7 decelerate the axis motion in a fixed distance by using the transducer signal to control the axis feed rate during deceleration until that fixed distance is reached. The transducer position is then algebraically added to the axis position to determine work surface location.

Another alternate method is to let normal deceleration occur after probe contact until zero velocity is reached. The transducer position is algebrically added to axis position to determine work surface location.

Figure 14:
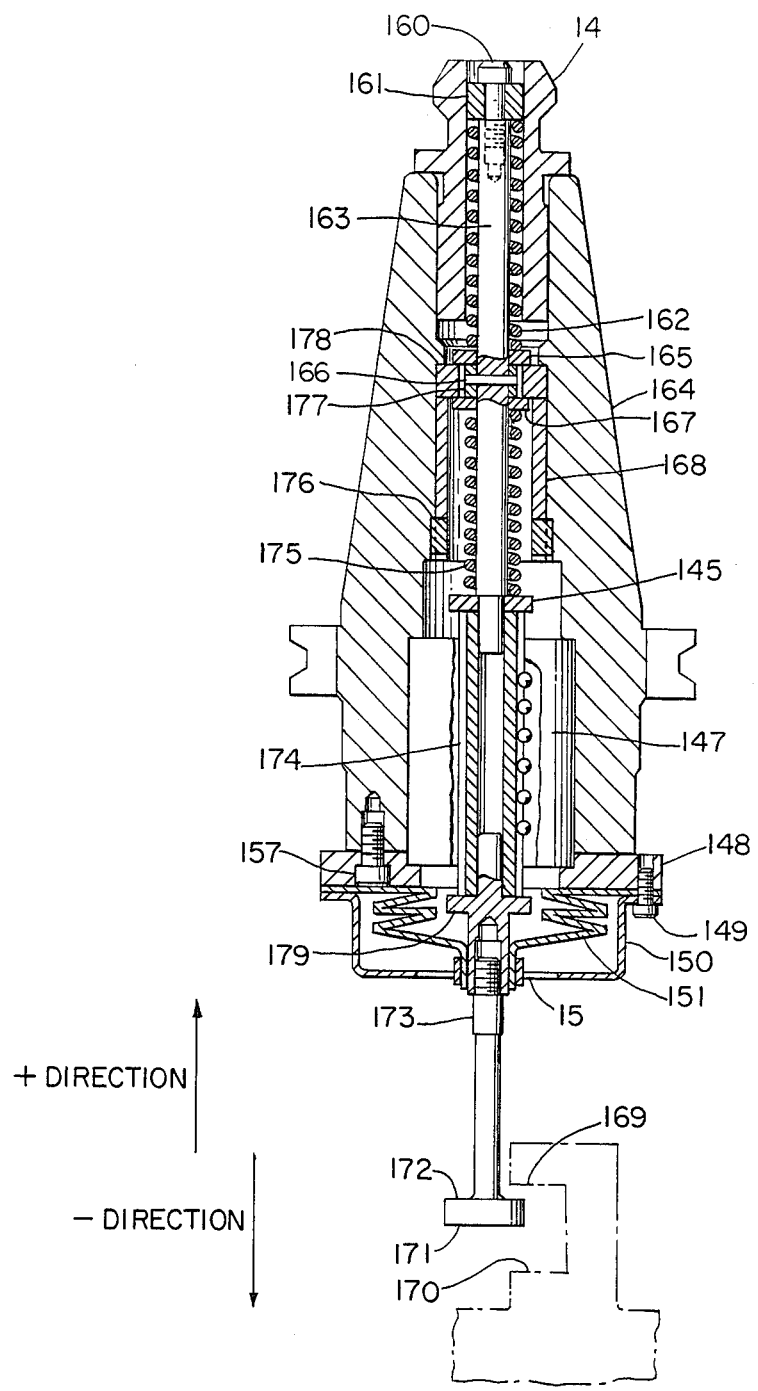
FIG. 14 Is a section of the probing device of my invention arranged for stylus deflection parallel to the probe center line in both the plus and minus direction also taken along line 5—5 of FIG. 2 similar to FIG. 5.

Referring now to FIG. 14, I show a probing device arranged for stylus deflection in both the plus and minus directions parallel to the probe center line. The probe device comprises a support body 164 and retention knob 14. Ball spline bushing 147 is secured in bore of support body 164 by cap 148. Stylus 173 is secured to stylus mounting head 180. Center shaft 174 is supported in ball spline bushing 147 by external ground splines. Stylus mounting head 179 is secured to one end of center shaft 155, tool actuating rod 163 and stop washer 145 are secured to the opposite end. Upper locating spring 162 and lower locating spring 175 are guided on tool actuating rod 163. Outer center bushing 178 is clamped in support body 164 by clamp sleeve 168 and clamp nut 176. Inner center bushing 177 is pinned actuating rod 163 by pin 166. Upper locating spring 162 is retained between upper sliding spring collar 165 and fitting spacer 161 by spacer screw 160. The lower locating spring 175 is contained by lower sliding spring collar 167 and stop washer 145. When stylus 173 is in a neutral position, i.e. when stylus 173 is not in contact with any work surface, the upper spring 162 whose compressive force is contained between spacer screw 160 and pinned inner bushing 177 provides a positive location for stylus 173 in the minus direction by sliding collar 165 acting against outer bushing 178. The lower sprin 175 whose compressive force is contained between center shaft 175 and pinned inner bushing 177 provides a positive location for stylus 173 in the plus direction by sliding collar 167 acting against clamped outer bushing 178. Inner bushing 177 and outer bushing 178 are equal lengths.

The upper locating spring 162 is preloaded sufficiently so that no deflection of spring 162 will occur during the "0" set tool preset and verification sequence of spindle control rod 12.

In operation spindle 8 is advanced toward the workpiece until stylus face 171 of stylus 173 contacts work surface 170. The spindle or Z axis will continue to advance, which will cause the stylus 173, stylus mounting head 179, center shaft 174 and tool actuating rod 163 to move relative to support body 156 and spindle 8. This motion will also cause tool actuating rod 163 to displace spindle control rod 12 and sliding element 22 (FIG. 3). Sliding element 22 will displace transducer (27,28) FIG. 4. The transducer displacement will cause computer numerical control 7 (FIG. 2 and FIG. 27) to decelerate the Z axis to zero velocity and process the transducer displacement information for determining the location of the work suface as previously described for the probe in FIG. 13. When the spindle is retracted in a probing cycle established to locate the under side of a work piece, stylus face 176 will contact work surface 169 again causing components related to transducer position to be displaced thereby causing signals to occur that determine work surface location.

Figure 15:
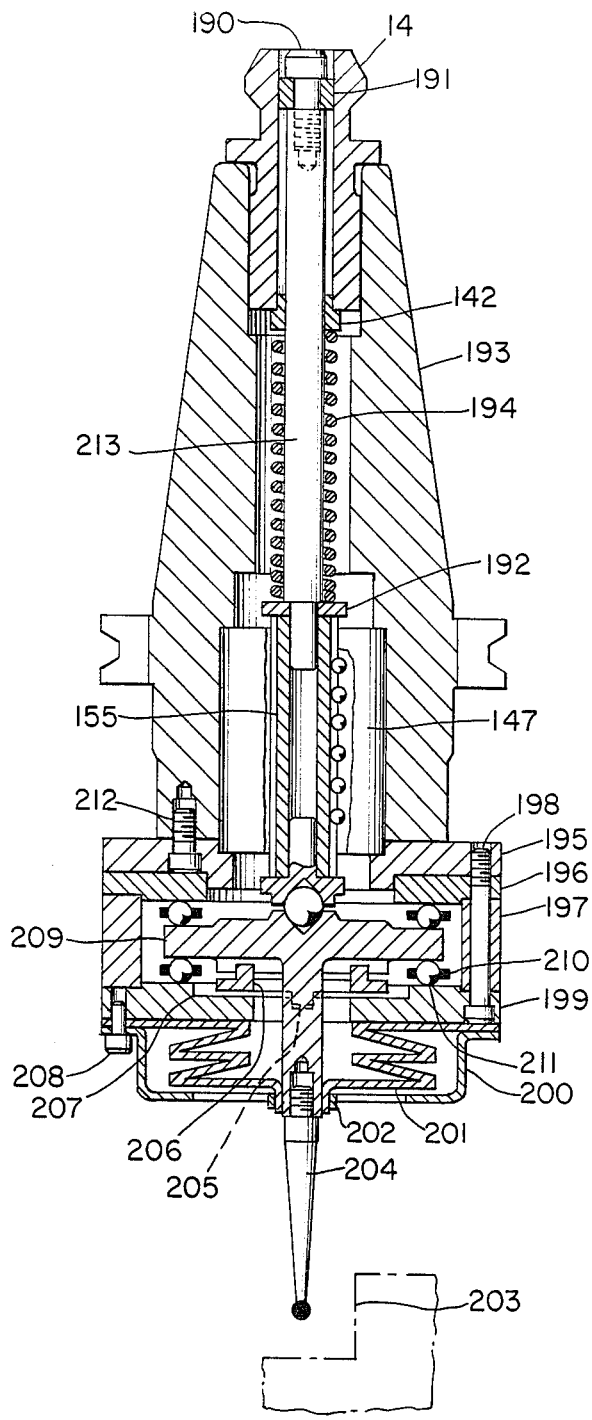
FIG. 15 Is a section of the probing device of my invention arranged for stylus deflection perpendicular to the probe center line also taken along line 5—5 of FIG. 2 similar to FIG. 5.
Figure 16:
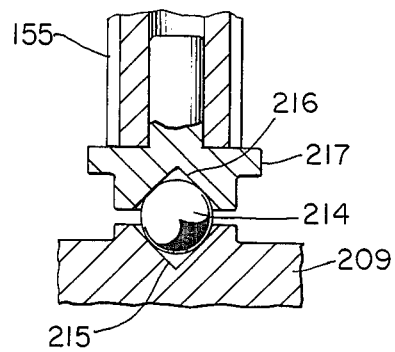
FIG. 16 Is an enlarged section of a portion of FIG. 15 showing ball and tapered hole detail.

Referring now to FIG. 15, I show a probing device arranged for stylus deflection perpendicular to the probe centerline. The probe device comprises a support body 193 and retention knob 14. Ball spline bushing 147 is secured to support body 193 by cap 195. Upper parallel plate 196, plate spacer 197 and lower parallel plate 199 are secured to and located by cap 195. Stylus 204 is secured to stylus mounting head 209. Stylus mounting held 209 is supported between upper parallel plate 196 and lower plate 199 by ball bearings 211 retained in spacer ring 210. Orientation retention ring 206 has upper keys that operate in slot 207 of stylus mounting head 209 and lower keys that operate in slot 205 of lower parallel plate 199. This assembly permits mounting head 209 to move freely in a plane perpendicular to the probe center line, but is prevented from rotating about the probe center line. Bellow 201 secured to mounting head 209 by clamp 202 and cover 200 is secured to lower parallel plate 199. Center shaft 155 is supported in ball spline bushing 147 by external ground splines. Tool actuating rod 213 and stop washer 192 are secured to center shaft 155. Probe preload spring 194 is guided on actuating rod 213 and is retained between stop washer 192 and spring stop 142. Fitting spacer 191 is secured to actuating rod 213 by spacer screw 190.

In FIG. 18 I show an enlarged section of a 90° tapered hole or cam 215 in mounting head 209. Precision ball 214 operates in cam 215, and cam 216 of center shaft plug 217. Pressure from preload spring 194 against cam 232, ball 214 and cam 216 maintains stylus mounting in a neutral position in a plane perpendicular to the probe center line and also in a plane parallel to the probe center line by seating stylus mounting head 230 solidly in tape 233 of disc 220.

In operation the spindle is traversed toward work surface 226 for locating a surface perpendicular to the probe center line. When stylus 224 contacts work surface 226 the stylus mounting head 230 is displaced from its neutral position causing center shaft 155 to be displaced axially by ball 214.

In another operating mode the spindle is traversed toward the work surface 225 in a direction perpendicular to the probe center line for locating a surface parallel to the center line. When stylus 224 contacts work surface 225, disc 220 is immediately displaced from its neutral position by pressure from stylus mounting head 230 through steep taper 233. The displacement will cause cam 232 in stylus mounting head 230 to displace center shaft 155 axially an amount equal to the displacement of stylus 224 by ball 214 rolling on ramp of cam 232 in probe mounting head 230 and cam 216 in center shaft plug 217.

The axial displacement of center shaft 155 from deflection of stylus 224 in a direction parallel or perpendicular to the probe center line will also move tool actuating rod 213 relative to support body 193 and spindle 8. This motion will also cause tool actuating rod 213 to displace spindle control rod 12 and sliding element 22 (FIG. 3). Sliding element 22 will displace transducer (27,28) FIG. 4. The transducer displacement will caus computer numerical control 7 (FIG. 2 and FIG. 27) to decelerate the axis motion to zero velocity and process the transducer displacement information for determining the location of the work surface as previously described for the probe in FIG. 13.

Figure 19:
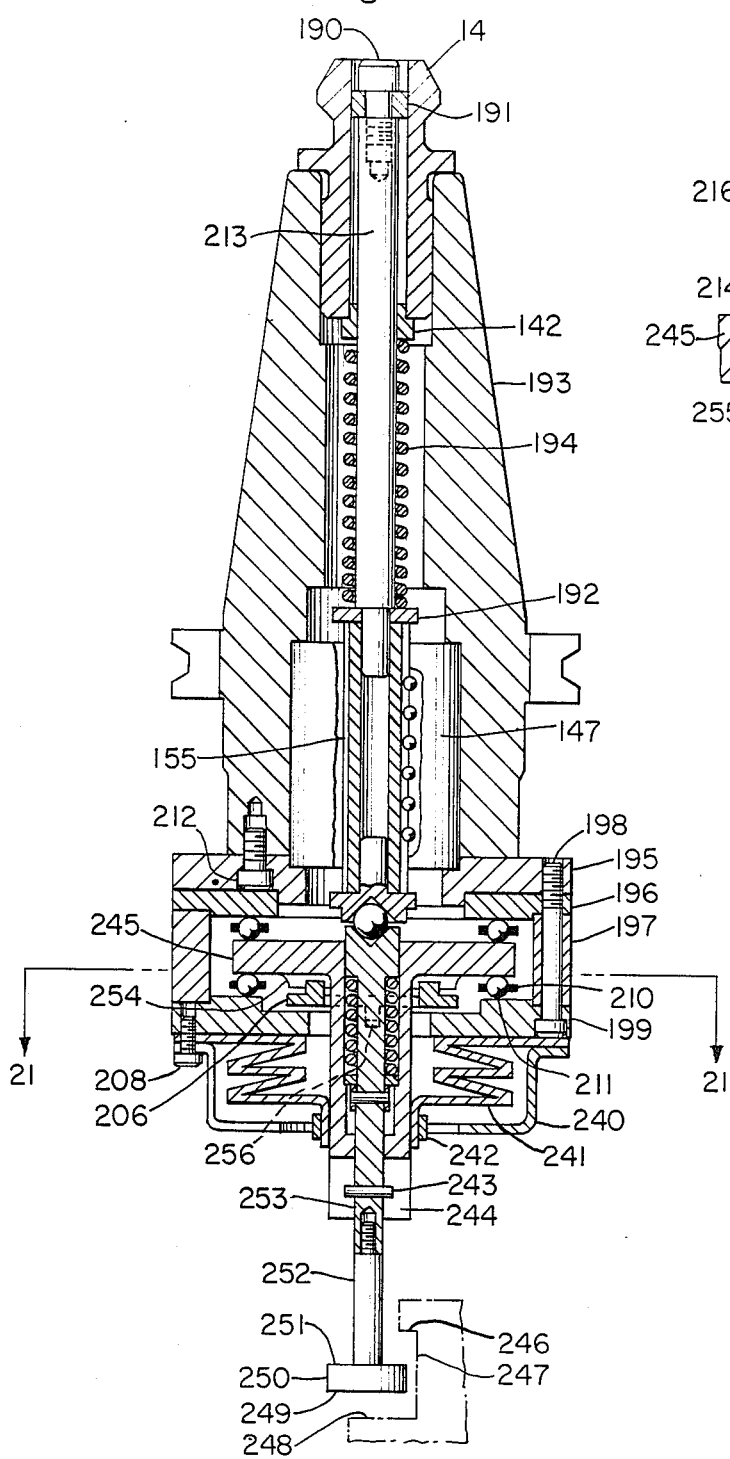
FIG. 19 Is a section of the probing device of my invention arranged for stylus deflection perpendicular to the probe center line and also for stylus deflection parallel to probe center line in both the plus and minus directions also taken along line 5—5 of FIG. 2 similar to FIG. 5.

Referring now to FIG. 19, I show a probe device arranged for stylus deflection perpendicular and parallel to the probe center line in both the plus and minus directions. The probe device comprises a support body 193 and retention knob 14. Ball spline bushing 147 is secured plate 196, plate spacer 197 and lower parallel plate 199 are secured to and located by end cap 195.

Figure 20:
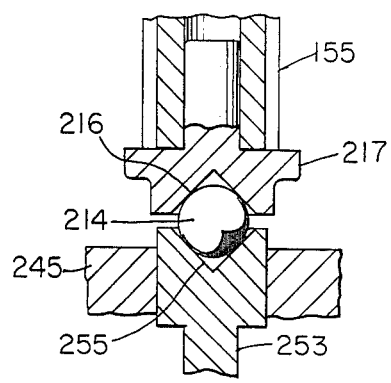
FIG. 20 Is an enlarged section of a portion of FIG. 19 showing ball and tapered hole detail.
Figure 22:
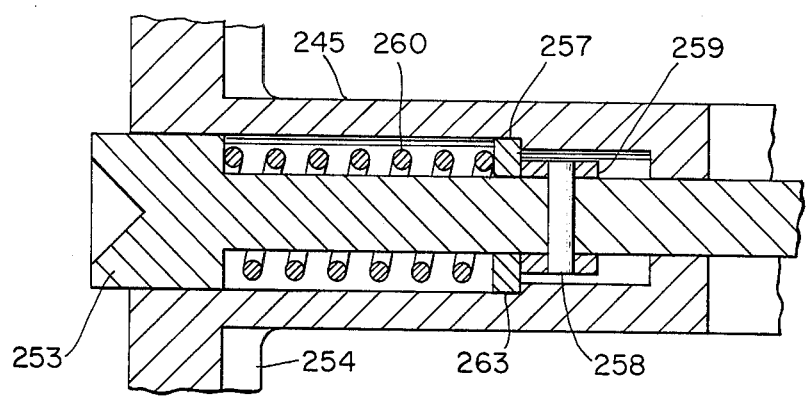
FIG. 22 is an enlarged section of a portion of FIG. 19 showing lower locating spring detail.

Disc 245 is supported between upper parallel plate 196 and lower parallel plate 199 by ball bearings 211 retained in spacer ring 210. Orientation retention ring 206 has upper keys that operate in slot 254 of disc 245 and lower keys that operate in slot 256 of lower plate 199. This assembly permits disc 245 to mover freely in a plane perpendicular to the probe center line but is prevented from rotating about the probe center line. Stylus 252 is secured to stylus mounting head 253 which is prevented from rotating by pin 243 operating in slot 244 of disc 245. Stylus mounting head 253 is located radially in disc 245 by a precision fit between the mounting inside diameter of disc 245 and the outside diameter of stylus mounting head 253. Stylus mounting head 253 is located axially by means of lower locating spring 260 FIG. 22 compressed between the shoulder of mounting head 253 and sliding collar 257 and contained by sleeve 259 fastened to mounting head 253 by pin 252. Sliding collar 257 actually determines axial location in a neutral position by being seated against shoulder 263 of disc 245. Bellows 241 is clamped to disc 245 by clamp 242, bellows cover 240 and bellows 241 are secured to lower mounting parallel mounting plate 199 by screw 208 center shaft 155 is supported in ball spline bushing 147 by external ground spline. Tool actuating rod 213 and stop washer 192 are secured to center shaft 155. Probe preload spring 194 is guided on actuating rod 213 and is retained between stop washer 192 and spring stop 142. Fitting spacer 191 is secured by actuating rod 213 by spacer screw 194. In FIG. 20 I show an enlarged section of a 90° tapered hole or cam 255 in stylus mounting head 253. Precision ball 214 operates in cam 255 and cam 216 of center shaft plug 217. Pressure from preload spring 194 through center shaft 155, ball 214 and mounting head 253 maintains sliding collar 257 against shoulder 263. The compressed load in lower locating spring 260 is greater than the preload force of spring 194. Therefore no additional deflection occurs in locating spring 260 when in the neutral position. Stylus mounting head 253 and disc 245 are retained in a neutral position in a plane perpendicular to the center line by pressure on precision ball 214 operation cam 255 of stylus mounting head 253 and cam 216 of center shaft plug 217 from spring 194.

In operation the spindle is traversed toward work surface 248 for locating a surface perpendicular to the probe center line in a minus direttion. When surface 251 of stylus 252 contacts work surface 246 the stylus mounting head 252 is displaced from its neutral position causing lower locating spring 260 to be compressed. This motion causes preload spring to displace center shaft 155 axially in a minus direction.

In another operating mode the spindle is traversed toward the work surface 247 in a direction perpendicular to the probe center line for locating a surface parallel to the center line. When surface 250 of stylus 252 contacts work surface 247 disc 220 is immediately displaced from its neutral position by pressure from stylus mounting head 252. The displacement will cause cam 255 in stylus mounting head 252 to displace center shaft 155 axially by an amount equal to the displacement of stylus 252 by ball 214 rolling on ramp of cam 255 in probe mounting head 253 and cam 216 in center shaft plug 217.

The axial displacement of center shaft 155 from deflection of stylus 252 in a direction perpendicular to the probe ceter line or parallel to the probe center line in both the plus and minus directions will also move tool actuating rod 213 relative to support body 193 and spindle 8. This motion will also cause tool actuating rod 213 to displace spindle control rod 12 and sliding element 22 (FIG. 3). Sliding element 22 will displace transducer (27,28) FIG. 4. The transducer displacement will cause computer numerical control 7 (FIG. 2 and FIG. 27) to decelerate the axis motion to zero velocity and process the transducer displacement information for determining the location of the work surface as previously described for the probe in FIG. 13.

Figure 21:
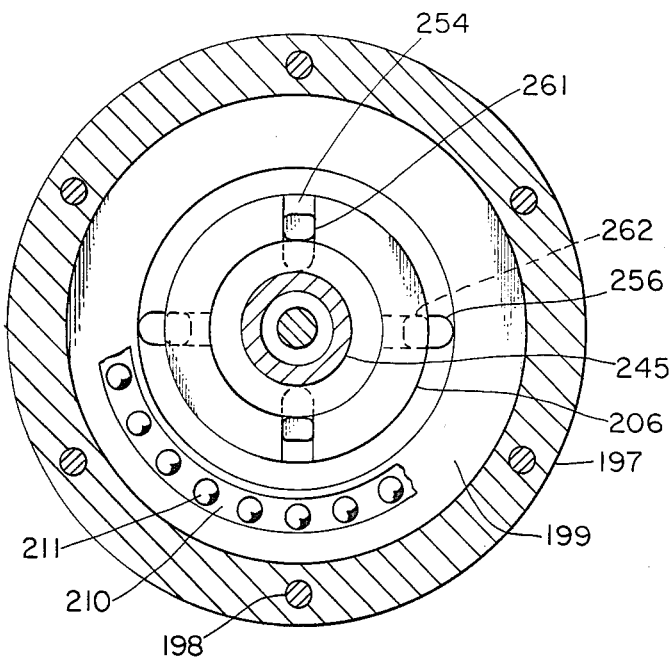
FIG. 21 is a section taken along line 21—21 of FIG. 19.

Referring to FIG. 21, I show in detail the probe head orientation retention assembly consisting of orientation retention ring 206 having upper keys 261 engaged in slot 254 of disc 245 (FIG. 19) and lower keys 262 engaged in slot 256 of lower parallel plate 199.

Figure 23:
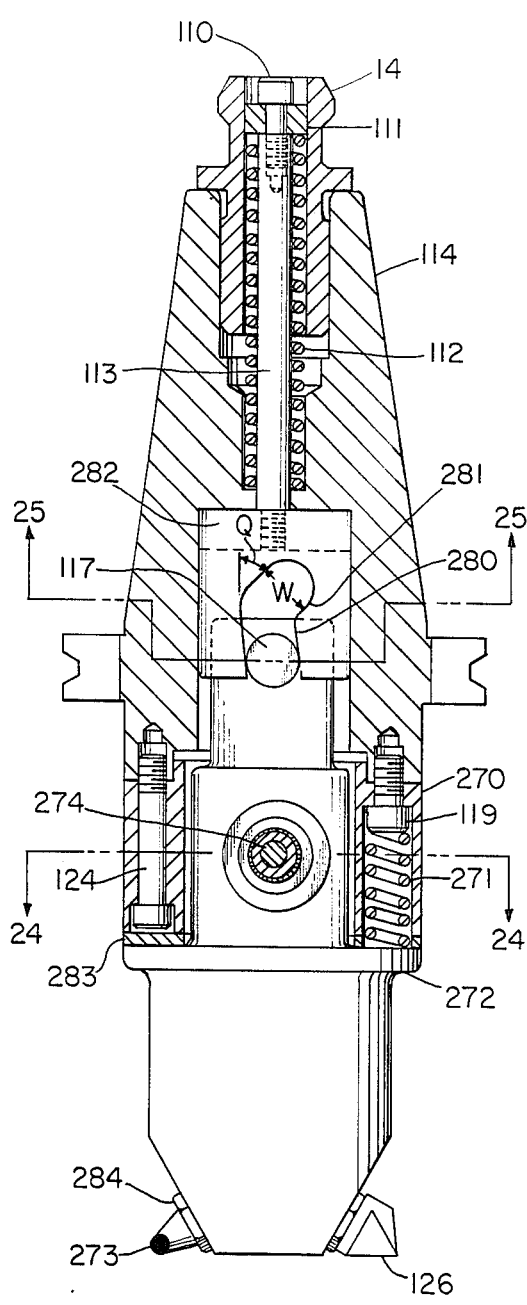
FIG. 23 is a section of the combination boring tool-probe portion of my invention also taken along line 5—5 of FIG. 2 similar to FIG. 5.

I now refer to FIG. 23 which shows a section through a combination probe-boring tool which consists of operating body 114 and retention knob 14. Operating body 114 is fitted with pivot block 270 to provide a support for pivot sleeve 279 and pivot locking stud 274. Boring bar 272 is guided in pivot block 270 between anti-friction radial bearings 278. Compressable seal 283 excludes debris from pivot block assembly. Preload springs 271 causes boring bar 272 to pivot around sleeve 279 on bearings 278 forcing cam bar 117 secured to boring bar 272 against cam slot 280 and 281 in linear cam 282. Tool actuating rod 113 is secured to linear cam 282 and retracts linear cam 282 by force from rod spring 112 acting against fitting spacer 111 secured to actuating rod 113 by spacer screw 110. Adjustable cutting tool cartridge 126 is mounted to boring bar 272. The position of cutting tool 126 is usually preset in a tool room environment. Probe stylus 273 is mounted to boring bar 272 in adjustable cartridge 284. The stylus position is set using a certified ring gage during a calibration cycle described later.

Before the combination probe-boring tool is inserted in spindle 8, control rod (FIG. 3) is fully retracted by linear motor (25,26) FIG. 4. After insertion linear motor (25,26) advances control rod 12 contacts spacer screw 110 of actuating rod 113, position of transducer (27,28) is processed by computer numerical control 7 to establish a "0" set point to verify tool presence and type of tool. The type of tool is determined by the relationship of spacer screw 110 to the gage line of taper of operating body 114. "0" setting eliminates any inaccuracies due to thermal growth of spindle assembly components relative to length of spindle control rod 12.

After the hole is bored with tool 126 preset to the required diameter the combination probe-boring tool is used to measure the hole that was just bored by using one of two methods described in Bore, Probe, Bore Cycle #1 or Bore, Probe, Bore Cycle #2. The adjustment value determined in these cycles is transmitted to the computer numerical control 7. The spindle control rod 12 is advanced by linear motor (25,26). The amount of advancement is measured by linear transducer (27,28) and is determined by the cam angle of cam slot 280 of linear cam 282 and the "length ratio" of boring bar 272. As spindle control rod 12 is advanced tool actuating rod 113 and linear cam 282 are advanced the same distance compressing spring 112. The motion of linear cam 282 and cam slot 280 causes cam bar 117 to rotate boring bar 272 about pivot sleeve 279 on bearings 278. This rotation moves cutting tool 126 the correct distance necessary to compensate for tool wear. During the adjustment and machining operations, preload springs 271 keep a positive load on boring bar 272 so no looseness can be present between boring bar 272, pivot sleeve bearing 278, cam bar 117, linear cam 282, and bore in operating body 114.

Figure 24:
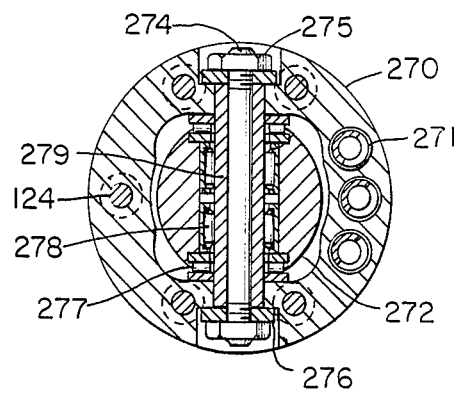
FIG. 24 is a section along line 24—24 of FIG. 23.

FIG. 24 is a section through pivot block 270 showing boring bar 272 being located in contoured internal shape of pivot block 270 by anti-friction thrust bearings 272. Boring bar 272 pivots about sleeve 279 on radial bearings 278. Length of sleeve 279 is fitted to eliminate any end play between the internal dimension of pivot block 270 and combined width of boring bar 272 and thrust bearing 277. In normal machining practices, end play may occur, but by fitting sleeve 279 and tensioning locking stud 274 by means of washers 276 and lock nuts 275 will cause a slight deflection in pivot block 270, thus eliminating end play. The fit of outter race of radial bearing 278 in bore of boring bar 272 will provide a preload to radial bearings 278 on sleeve 279. Sleeve 279 has a tight fit in bore of pivot block 270. Therefore the entire pivot mounting of boring bar 272 in pivot block 270 is void of looseness and anti-friction bearings provide friction free motion. This is necessary for the sensitivity necessary during the probing cycles.

A section through preload springs 271 is also shown.

Figure 25:
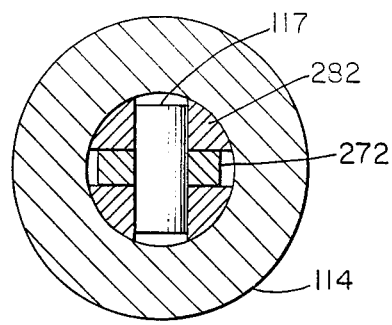
FIG. 25 is a section along line 25—25 of FIG. 23.

FIG. 25 is a section through cam bar 117 117 having a press fit in boring bar 272 and slidably fit in linear cam 282. Linear cam 282 is fully supported in bored hole of operating body 114.

COMBINATION PROBE-BORING TOOL

Calibration Cycle #1

No X, Y Motion

Ref. FIGS. 23, 24, 25, 26, 27.

To be used when boring and probing is to be done while keeping the spindle directly over the hole. Stylus radius (from spindle center) to be less than cutting tool radius for clearing, but difference not be be greater than adjustment range of tool.

Step 1. Mount a certified ring gage to the machine table having the same inside diameter as the hole to be bored.

Step 2. Locate spindle center over center of ring gage.

Step 3. Insert selected combination boring tool in the spindle.

Step 4. Make sure stylus is fully retracted into adjustable mounting 284.

Step 5. Extend cam 282 with linear motor (25,26) to position locating cam bar 117 to midpoint of probe section of cam 281 (initial gage setting point).

Step 6. Advance tool into gage hole.

Step 7. Adjust stylus 273 to gage hole diameter using feeler gage for minimum clearance.

Step 8. Retract cam 0.010" by control of linear motor (25,26).

Step 9. Advance cam 282 with linear motor (25,26) past gage initial setting point (Step 5) 0.010" more than feeler gage thickness.

Step 10. Stylus 273 will contact gage inside diameter preventing further angular displacement of boring bar 272 by preload spring 271 about pivot sleeve 279. Cam bar 117 will lose contact with probe cam surface 281. Cam slot width W at this point is greater than diameter of cam bar 117 providing proper clearance.

Step 11. Current to linear motor (25,26) is reduced but not reversed.

Step 12. Force from actuating rod spring 112 will overcome lower force from linear motor (25,26) retracting cam 282.

Step 13. Cam 282 and linear motor (25,26) will stop retracting when probe cam surface 281 against contacts cam bar 117. Force of rod spring 112 minus force of linear motor (25,26) acting on cam bar 117 is not sufficient to overcome force from preload spring 271.

Step 14. Position of encoder (27,28) is processed by CNC control 7 to establish correct gage setting dimension.

Step 15. Position cam 282 with linear motor (25,26) to position determined in Step 8. Both stylus and tool with clear bore.

Step 16. Retract tool clear of ring gage.

Bore, Probe, Bore Cycle #1

No X, Y Motion

To be used when boring and probing is to be done without moving spindle center relative to hole center boring tool.

Step 1. Insert selected combination boring tool in the spindle.

Step 2. Locate spindle center over hold to be bored.

Step 3. Bore hole with preset boring tool with cam 282 fully retracted.

Step 4. Retract tool clear of bore.

Step 5. Position cam 282 with linear motor (25,26) to point established by Steps 5 and 8 of calibration cycle #1, both stylus and probe will clear bore.

Step 6. Advance tool into bore.

Step 7. Advance cam 282 with linear motor (25,26) to point established in Step 9 of calibration cycle #1.

Step 8. Stylus 273 will contact bore inside diameter preventing further angular displacement of boring bar 272 by preload spring 271 about pivot sleeve 279. Cam bar 171 will lose contact with probe cam surface 281. Cam slot width W at this point is greater than diameter of cam bar 117 providing proper clearance.

Step 9. Current to linear motor (25,26) is reduced but not reversed.

Step 10. Force from actuating rod spring 112 will overcome lower force from linear motor (25,26) retracting cam 282.

Step 11. Cam 282 and linear motor (25,26) will stop retracting when probe cam surface 281 again contacts cam bar 117. Force of rod spring 112 minus force of linear motor (25,26) acting on cam bar 117 is not sufficient to overcome force from preload spring 271.

Step 12. Position of encoder (27,28) is processed by CNC control 7.

Step 13. CNC control compares position of encoder (27,28) in above step 12 to step 14 of calibration cycle #1. Any differential determines the amount of correction required in position of cam 282 for finish boring.

Step 14. Position cam 282 with linear motor (25,26) to point established by Steps 5 and 8 of calibration cycle #1, both stylus and probe will clear bore.

Step 15. Retract tool clear of bore.

Step 16. Extend cam 282 to position determined in above step #13.

Step 17. Finish bore hole.

Calibration Cycle #2

Using X, Y Motion

To be used if boring bar configuration requires the cutting tool to be at a much greater radius than the probe stylus or if using ring gage diameter other than hole to be bored.

Step 1. Mount a certified inside diameter ring gage to machine table having a known diameter.

Step 2. Locate spindle center over center of ring gage.

Step 3. Insert selected combination boring tool in the spindle.

Step 4. Fully extend cam 282 using linear motor (25,26).

Step 5. Advance tool in gage hole-stylus and tool will clear hole.

Step 6. Reduce current to linear motor (25,26) that is just sufficient to maintain cam 282 in extended position.

Step 7. Advance X or, and Y axis at a programmed feed rate until stylus 273 contacts gage bore, which in turn will compress tool preload spring 271 swinging cam bar 117 toward spindle center. This action will allow actuating rod spring to displace linear motor (25,26) and encoder (27,28) cam angle Q is selected to produce a 1:1 ratio between deflection of stylus 273 and displacement of encoder (27,28). The encoder displacement will stop X, Y axis motion. Encoder position is then algebraically added to X, Y position relative to center of gage hold, giving actual X, Y displacement.

Step 8. Knowing X, Y displacement and gage diameter is sufficient to calibrate probe.

Step 9. Locate spindle center over center of ring gage.

Step 10. Retract spindle.

Bore, Probe, Bore Cycle #2

Using X, Y Motion

Step 1. Inserted selected combination boring tool in the spindle.

Step 2. Locate spindle center over center of hole to be bored.

Step 3. Bore hole with preset boring tool with cam 282 fully retracted.

Step 4. Retract tool clear of bored hole.

Step 5. Fully extend cam 282 using linear motor (25,26).

Step 6. Advance tool into just completed bored hole.

Step 7. Reduce current to linear motor (25,26) that is just sufficient to maintain cam 282 in extended position.

Step 8. Advance X or, and Y axis at a programmed feed rate until stylus 273 contacts gage bore, which in turn will compress tool preload spring 271 swinging cam bar 117 toward spindle center. This action will allow actuating rod spring to displace linear motor (25,26) and encoder (27,28) cam angle Q is selected to produce a 1:1 ratio between deflection of stylus 273 and displacement of encoder (27,28). The encoder displacement will stop X, Y axis motion. Encoder position is then algebraically added to X, Y position relative to center of gage hole, giving actual X, Y displacement.

Step 9. CNC control 7 compares X, Y displacement in Step 8 to X, Y displacement in Step 7 of calibration cycle #2. Adding the X, Y differential to the differential between the known gage diameter and the finished diameter to be bored determines the amount of correction required in position of cam 282 for finish boring.

Step 10. Locate spindle center over center of hole to be bored.

Step 11. Retract spindle.

Step 12. Extend cam 282 with linear motor (25,26) to position determined by Step 9.

Step 13. Finish bore hole.

Step 14. Retract spindle.

Figure 26:
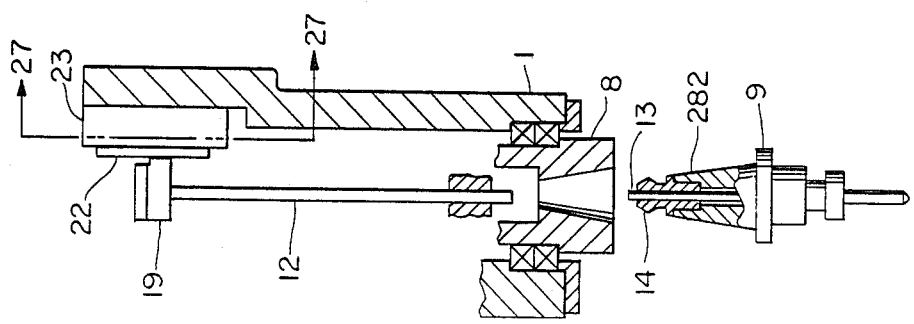
FIG. 26 is a mechanical schematic of my inventions also taken along line 3—3 of FIG. 1 similar to FIG. 3.

Referring now to FIG. 26 and FIG. 27, I show a mechanical schematic comprising headstock 1 with spindle 8 arranged to retain taper 285 of typical tooling device 9 having a tool actuating rod 13. Spindle control rod 12 is rotably connected to sliding element 22 by bearings in housing 19. Sliding element 22 is slidably supported in base 23. Fixed to base 23 is encoder or transducer 27 which works in conjunction with sliding scale 28 mounted to sliding element 22 to provide position location information of sliding element 22 to CNC control 7. Also fixed to based 23 is coil assembly 25 of linear servomotor which works in conjunction with permanent magnet assembly 26 fastened to sliding element 22. Computer numerical control 7 determines the direction and amount of force generated by linear servo motor (25,26). The force on linear motor (25,26) can be controlled to low levels for use in the tool verification and presence cycle, set zero sequence, surface sensing with tool adapters, and probing devices. Higher forces from linear motor (25,26) are applied for milling adapter reset, automatic boring tool operations for precision boring and contouring. The linear transducer (27,28) tracks sliding element location on all low force application and communicates position of sliding element 22 for all these applications to computer numerical control 7. Linear transducer (27,28) also provides feedback information to computer numerical control 7 during closed loop operation when linear motor (25,26) is operating in high force applications. Limit switches 290 are used for safety overtravel purposes.

The detail functions of the above elements are described in the prior descriptions of the four basic tooling devices described in this invention i.e.—surface sensing adapter, automatic boring tool, multi-probing devices and combination probe-boring tool.

Having thus described my inventions, what I claim as new and useful and desire to secure by U.S. Letters Patent is:

1. A tooling device for computer numerically controlled machining centers having a spindle, a control rod passing through said spindle, a sliding element, said control rod connected to said sliding element, a linear motor and transducer connected to said sliding element to control the position and force of said sliding element, a spring loaded telescoping tool holder, an actuating rod in said tool holder adapted to engage said control rod, said actuating rod displacing said control rod to displace said sliding element to displace said transducer, said transducer having electronic coupling means to the axis feed rate of the computer numerical control for controlling spindle deceleration from rapid traverse to zero traverse, said transducer producing a signal to transmit work surface location to the computer numerical control to feed the spindle to a programmed depth at a programmed feed rate.

2. The device as described in claim 1 having a spring loaded telescoping tool holder that will unseat during drilling operations if said drill breaks, said unseating displaces said transducer before said programmed depth is reached signaling said computer numerical control that a malfunction has occurred.

3. The device described in claim 1 wherein said spring loaded telescoping tool holder is arranged to drive taps and is partially compressed during deceleration to a predetermined position of the transducer, whereby a in-position signal is transmitted to said computer numerical control, said in-position signal determines work surface location and starts spindle rotation, said spindle rotation will cause said tap to feed into said work piece causing said tap holder to displace transducer, said displacement will signal computer numerical control to feed said spindle at the tap feed rate to a programmed depth, reversing said spindle rotation at said programmed depth causing said tool holder to move said transducer to a position past the predetermined position, said spindle feed will reverse following said tap from hold, said spindle will retract to a programmed position relative to said work piece.

4. The device as described in claim 3 having a spring loaded telescoping tool holder that will change its operating position during a tapping operation if said tap should break or stall, said change in operating position will displace said transducer before said programmed depth is reached signaling said computer numerical control that a malfunction has occurred.

5. The device described in claim 1 wherein said telescoping tool holder is adapted to drive milling cutters and is seated solidly in said tool adapter body during milling operations and is retained in the seated position independent of machining loads by means of a spring loaded ball locking mechanism comprising an internal cam groove in said adapter body, a series of balls located in a series of holdes in said telescoping tool holder, an external cam surface with a locking angle working in conjunction with said balls, said external cam surface being located on a spring loaded cam secured to a tool actuating rod and slidably mounted in an internal bore of said sliding tool holder, said spring load on said locking angle forces said balls against said internal groove in said adapter body forcing said tool holder to be rigidly seated during machining operation.

6. The device described in claim 5 wherein said telescoping tool holder has a self releasing external taper on the lower portion arranged to seat securely in a matching internal taper of said adapter body when said tool holder is in the fully telescoped position, said tool holder also has the center of said holes for said balls located at an angle less than 90° from the centerline of said tool holder, said angle of said holes provides radial stability to said tool holder at end of said tool holder opposite said taper by balls being forceably locked between internal cam groove in said adapter body and angle of said holes by locking angle of said spring locaded sliding cam whereby said tool holder is rigidly locked both axially and radially to eliminate any looseness between said tool adapter body and said tool holder during machining operations.

7. The device in claim 5 wherein said servo motor moves said spindle control rod against said tool actuating tod, when said machining operation is complete with sufficient force to overcome said spring force on said sliding cam, moving said locking angle of said sliding cam away from said balls allowing and assisting tool holder spring to return to said tool holder to the work sensing cycle position.

8. A boring device for computer numerical controlled machining centers having a spindle, a control rod, said control rod passing through said spindle, a sliding element, said control rod connected to said sliding element, a linear motor and transducer connected to said sliding element to control the position and force of said sliding element, an adjustable boring tool mounted in said spindle, said adjustable boring tool having a main operating body secured in said spindle, a preload adjustable boring bar, a cam bar, said cam bar secured to one end of said boring bar, said boring bar pivotly secured to said operating body, a linear cam for controlling the position of said cam bar slidably mounted in said support body, a tool actuating rod secured to said linear cam, an actuating rod spring, said actuating rod spring maintains said actuating rod and said linear cam in a fully retracted position, a boring head, said boring head secured to end of said boring bar opposite said cam bar, a cutting tool mounted in said boring head, said spindle control rod contacts said tool actuating rod during operations and overcomes the force of said actuating rod spring to determine the position of said tool actuating rod and said linear cam, a preload spring, said preload spring mounted on one end of said operating body to pivot said boring bar in a direction to oppose the force of said linear cam engaging with said cam bar to pivot said boring bar to a preselected position to locate said cutting tool for controlling the diameter of said bored hole.

9. A probing device for computer numerically controlled machining centers having a spindle, a control rod passing through said spindle, a sliding element, said control rod connected to said sliding element, a linear motor and transducer connected to said sliding element to control the position and force of said sliding element, said probing device mounted in said spindle comprising a spindle mounted support body, a stylus mounted head secured to a spring biased center shaft slidably mounted in said support body, a tool actuating rod secured to said center shaft, a stylus in said stylus mounting head, said stylus, mounting head, center shaft and actuating rod movable relative to said support body, an object, said tool actuating rod is displaced when said stylus is deflected by said object while said probing device is moving in a minus direction parallel to the axis of said spindle, said displacement of said tool actuating rod displaces said spindle control and said sliding element, said transducer is displaced by said sliding element, said transducer having electronic coupling means to the axis feed rate of the computer numerical control for controlling the spindle advance from rapid traverse to zero feed rate, said transducer to trigger position detection circuits of said computer numerical control when relative motion begins between said stylus mounting head and said support body to track said relative motion until zero velocity is reached, whereby said output of said detection circuit is processed by said computer numerical control to determine relative position of said object to said stylus when said probing device is moved in a minus direction parallel to the axis of said spindle until said stylus is deflected by said object.

10. The device described in claim 9 for defining the contour of an object relative to a plane perpendicular to the axis of said spindle when said stylus is moved along said object in a direction perpendicular to the axis of said spindle.

11. A probing device for computer numerically controlled machining centers having a spindle, a control rod passing through said spindle, a sliding element, said control rod connected to said sliding element, a linear motor and transducer connected to said sliding element to control the position and force of said sliding element, said probing device mounted in said spindle comprising a spindle mounted support body, a stylus mounting head secured to a spring biased center shaft slidably mounted in said support body, a means for retaining opposed preload forces to provide positive neutral position of said stylus mounting, a tool actuating rod secured to said center shaft, a stylus in said stylus mounting head, said stylus, mounting head, center shaft and actuating rod movable relative to said support body, an object, said tool actuating rod is displaced when said stylus is deflected by said object while said probing device is moving in a plus or minus direction parallel to the axis of said spindle, said displacement of said tool actuating rod displaces said spindle control and said sliding element, said transducer is displaced by said sliding element, said transducer having electronic coupling means to the axis feed rate of the computer numerical control for controlling the spindle advance from rapid traverse to zero feed rate, said transducer to trigger position detection circuit of said computer numerical control when relative motion begins between said stylus mounting head and said support body to track said relative motion until zero velocity is reached, whereby said output of said position detection circuit is processed by said computer numerical control to determine relative position of said object to said stylus when said probing device is moved in a plus or minus direction parallel to the axis of said spindle until said stylus is deflected by said object.

12. A probing device for computer numerical controlled machining centers having a spindle, a control rod passing through said spindle, a sliding element, said control rod connected to said sliding element, a linear motor and transducer connected to said sliding element to control the position and force of said sliding element, said probing device mounted in said spindle comprising a spindle mounted support body, a stylus mounting head movable relative to said support body in a direction perpendicular to the axis of said spindle, a stylus in said mounting head, an object, a means for displacing said spindle control rod, said sliding element and said linear transducer when said stylus is deflected by said object when said probing device is moved in a direction perpendicular to the axis of said spindle, said transducer having electronic coupling means to the axis feed rate of said computer numerical control for controlling the spindle advance from rapid traverse to zero feed rate, said transducer to trigger position detection circuits of said computer numerical control when relative motion begins between stylus mounting head and said support body and to track said relative motion until zero velocity is reached, whereby said output of said position detection circuit is processed by said computer numerical control to determine relative position of said object to said stylus when said probing device is moved in a direction perpendicular to the axis of said spindle until said stylus is deflected by said object.

13. A probing device for computer numerically controlled machining centers having a spindle, a control rod passing through said spindle, a sliding elemet, said control rod connected to said sliding element, a linear motor and transducer connected to said sliding element to control the position and force of said sliding element, said probing device mounted in said spindle comprising a spindle mounted support body, a center shaft, a spring to bias said center shaft, said center shaft mounted to slide axially in said support body, a tool actuating rod secured to said center shaft, a rigid disc type stylus mounting head movable relative to said support body in a direction perpendicular to the axis of said spindle, a cam in said stylus mounting head, a ball carried in said cam of said mounting head, a ball carried in said cam of said mounting head, a cam in said center shaft for receiving said ball, said spring of said center shaft applies pressure on said ball and said cam surfaces to determine a neutral position of said stylus mounting head, a stylus in said stylus mounting head, an object, any displacement of said stylus when moved in a direction perpendicular to the axis of said spindle against said object causes said ball operating in said cam surfaces to displace said center shaft and said tool actuating rod an amount equal to the displacement of said stylus, said stylus remains parallel to the axis of said spindle during stylus displacement, a floatably mounted orientation retention ring keying said rigid disc to said fixed support body, said displacement of said tool actuating rod displaces said spindle control rod and said sliding element, said transducer is displaced by said sliding element, said transducer having electronic coupling means to the axis feed rate of said computer numerical control for controlling the spindle advance from rapid traverse to zero feed rate, said transducer to trigger position detection circuits of said computer numerical control when relative motion begins between said stylus mounting head and said support body and to track said relative motion until zero velocity is reached, whereby said output of said position detection circuit is processed by said computer numerical control to determine relative position of said object to said stylus when said probing device is moved in a direction perpendicular to the axis of said spindle until said stylus is deflected by said object.

14. A probing device for computer numerically controlled machining centers having a spindle, a control rod passing through said spindle, a sliding element, said control rod connected to said sliding element, a linear motor and transducer connected to said sliding element to control the position and force of said sliding element, said probing device mounted in said spindle comprising a spindle mounted support body, a stylus mounting head movable relative to said support body in a plus direction parallel to the axis of said spindle and in a direction perpendicular to the axis of said spindle, a stylus in said stylus mounting head, an object, a means for displacing said spindle control rod, said sliding element and said linear transducer when said stylus is deflected by said object when said probing device is moved in a minus direction parallel to the axis of said spindle or in a direction perpendicular to the axis of said spindle, said transducer having electronic coupling means to the axis feed rate of said computer numerical control for controlling the spindle advance from rapid traverse to zero feed rate, said transducer to trigger position detection circuits of said computer numerical control when relative motion begins between said stylus mounting head and said support body and to track said relative motion until zero velocity is reached, whereby said output of said position detection circuit is processed by said computer numerical control to determine relative position of said object to said stylus when probing device is moved in a minus direction parallel to the axis of said spindle or in a direction perpendicular to the axis of said spindle until said stylus is deflected by said object.

15. A probing device for computer numerically controlled machining centers having a spindle, a control rod passing through said spindle, a sliding element, said control rod connected to said sliding element, a linear motor and transducer connected to said sliding element to control the position and force of said sliding element, said probing device mounted in said spindle comprising a spindle mounted support body, a center shaft, a spring to bias said center shaft, said center shaft mounted to slid axially in said support body, a tool actuating rod secured to said center shaft, a rigid disc movable relative to said support body in a direction perpendicular to the axis of said spindle, a stylus mounting head, said rigid disc arranged to locate said stylus mounting head in a steep tapered hole in said disc with said stylus mounting head having a matched taper to fit said hole, a cam in said stylus mounting head, a ball carried in said cam in said stylus mounting head, a cam in said center shaft for receiving said ball, said spring of said center shaft applies pressure on said ball and said cam surfaces, said pressure locates said stylus mounting head axially in said tapered hole and locates said stylus mounting head and rigid disc radially in a neutral position, a stylus in said stylus mounting head, an object, any displacement of said stylus when moved in a minus direction parallel to the axis of said spindle or in a direction perpendicular to the axis of said spindle against said object causes said ball operating in said cam surfaces to displace said center shaft and said tool actuating rod an amount equal to the displacement of said stylus, said stylus remains parallel to the axis of said spindle during stylus displacement, a floatably mounted orientation retention ring keying said rigid disc to said fixed support body, said displacement of said tool actuating rod displaces said spindle control rod and said sliding element, said transducer is displaced by said sliding element, said transducer having electronic coupling means to the axis feed rate of said computer numerical control for controlling the spindle advance from rapid traverse to zero feed rate, said transducer to trigger position detection circuit of said computer numerical control when relative motion begins between said stylus mounting head and said support body and to track said relative motion until zero velocity is reached, whereby said output of said position detection circuit is processed by said computer numerical control to determine relative position of said object to said stylus when said probing device is moved in a minus direction parallel to the axis of said spindle or in a direction perpendicular to the axis of said spindle until said stylus is deflected by said object.

16. A probing device for computer numerically controlled machining centers having a spindle, a control rod passing through said spindle, a sliding element, said control rod connected to said sliding element, a linear motor and transducer connected to said sliding element to control the position and force of said sliding element, said probing device mounted in said spindle comprising a spindle mounted support body, a stylus mounting head movable relative to said support body in a plus and minus direction parallel to the axis of said spindle and in a direction perpendicular to the axis of said spindle, a stylus in said stylus mounting head, an object, a means for displacing said spindle control rod, said sliding element and said linear transducer when said stylus is deflected by said object when said probing device is moved in a plus or minus direction parallel to the axis of said spindle or in a direction perpendicular to the axis of said spindle, said transducer having electronic coupling means to the axis feed rate of said computer numerical control for controlling the spindle advance from rapid traverse to zero feed rate, said transducer to trigger position detection circuits of said computer numerical control when relative motion begins between said stylus mounting head and said support body and to track said relative motion until zero velocity is reached, whereby said output of said position detection circuit is processed by said computer numerical control to determine relative position of said object to said stylus when said probing device is moved in a plus or minus direction parallel to the axis of said spindle or in a direction perpendicular to the axis of said spindle until said stylus is deflected by said object.

17. A probing device for computer numerically controlled machining centers having a spindle, a control rod passing through said spindle, a sliding element, said control rod connected to said sliding element, a linear motor and transducer connected to said sliding element to control the position and force of said sliding element, said probing device mounted in in said spindle comprising a spindle mounted support body, a center shaft, a spring to bias said center shaft, said center shaft mounted to slid axially in said support body, a tool actuating rod secured to said center shaft, a rigid disc movable relative to said support body in a direction perpendicular to the axis of said spindle, a stylus mounting head, said rigid disc arranged to locate said stylus mounting head in a counter bore in said rigid disc, a preloaded spring assembly secured to said stylus mounting head, said spring assembly axially positions said mounting head in said counter bored hole, a cam in said stylus mounting head, a ball carried in said cam in said stylus mounting head, a cam in said center shaft for receiving said ball, said preload spring assembly of said stylus mounting head having a preload value greater than the value of said center shaft spring, said center shaft spring locates said stylus mounting head and spring preload assembly axially and said rigid disc radially in a neutral position, a stylus in said stylus mounting head, an object, any displacement of said stylus when moved in a plus or minus direction parallel to the axis of said spindle or in a direction parallel to the axis of said spindle against said object causes said ball operating in said cam surfaces to displace said center shaft and said tool actuating rod an amount equal to the displacement of said stylus, said stylus remains parallel to the axis of said spindle during stylus displacement, a floatably mounted orientation retention ring keying said rigid disc to said fixed support body, said displacement of said tool actuating rod displaces said spindle control rod and said sliding element, said transducer is displaced by said sliding element, said transducer having electronic coupling means to the axis feed rate of said computer numerical control for controlling the spindle advance from rapid traverse to zero feed rate, said transducer to trigger position detection circuit of said computer numerical control when relative motion begins between said stylus mounting head and said support body and to track said relative motion until zero velocity is reached, whereby said output of said position detection circuit is processed by said computer numerical control to determine relative position of said object to said stylus when said probing device is moved in a plus or minus direction parallel to the axis of said spindle or in a direction perpendicular to the axis of said spindle until said stylus is deflected by said object.

18. A combination probing-boring device for computer numerically controlled machining centers having a spindle, a control rod, said control rod passing through said spindle, a sliding element, said control rod connected to said sliding element, a linear motor and transducer connected to said sliding element to control the position and force of said sliding element, a combination probe and adjustable boring tool mounted in said spindle for boring, measuring, and correcting the diameter of a bored hole without removing said combination tool from said spindle, said combination tool having a main operating body secured in said spindle, a preloaded adjustable boring bar, a cam bar, said cam bar secured, to one end of said boring bar, said boring bar pivotally secured to said operating body, a linear cam for controlling the position of said cam bar slidably mounted in said support body, a tool actuating rod secured to said linear cam, an actuating rod spring, said actuating rod spring maintaining said actuating rod and said linear cam in a fully retracted position, a boring head, said boring head secured to the end of said boring bar opposite said cam bar, a cutting tool mounted in said boring head, a probe stylus mounted in said boring head opposite said cutting tool, whereby said spindle control rod contacts said tool actuating rod during operation and overcomes the force of said actuating rod spring thereby determining the position of said tool actuating rod and said linear cam, a preload spring, said preload spring mounted at one end of said operating body to pivot said boring bar in a direction to oppose the forces of said linear cam operating on said cam bar, said linear cam engaging with said cam bar to pivot said boring bar to a preselected position to locate said cutting tool for controlling the diameter of said bored hole, said linear cam having two distinct cam angles, a lower cam angle, said lower cam angle being gradual to operate against said cam bar for the boring operations, an upper cam angle, said upper cam angle being steep and in a direction opposite lower cam angle to operate against said cam bar for the probing operation, whereby said spindle control rod positions said linear cam to engage said upper cam angle with said cam bar after a hole has been bored and combination tool has been retracted from said hole, the position of said linear cam determines an angle of said boring bar that provides clearance in said bored hole for said cutting tool and said probe stylus, said combination tool is advanced into said bored hole, said spindle control rod advances said linear cam to a point determined in a previous calibration procedure allowing said preload spring to pivot said boring bar until said stylus contacts the inside diameter of said bored hole, at this point said cam bar will not be in contact with any cam surface, current to said linear motor is reduced allowing actuating rod spring to position said linear cam until said upper cam makes contact with said cam bar but not causig said stylus to lose contact with bored hole. said linear cam position determines the position of said tool actuating rod, said spindle control rod, said sliding element and said transducer, said transducer position is then processed by said computer numerical control and compared to a position determined in a previous calibrating procedure to determine actual size of the bored hole.

* * * * *

UNITED STATES PATENT AND TRADEMARK OFFICE
CERTIFICATE OF CORRECTION

PATENT NO. : 4,778,313

DATED : October 18, 1988

INVENTOR(S) : Robert A. Lehmkuhl

It is certified that error appears in the above-identified patent and that said Letters Patent is hereby corrected as shown below:

Column 12, line 7, "ca" should read -- cam --.

Column 13, line 10, "type" should read -- types --.

Column 16, line 66, "spaces" should read -- spacer --.

Column 20, line 45, "sprin" should read -- spring --.

Signed and Sealed this

Twenty-third Day of May, 1989

Attest:

DONALD J. QUIGG

Attesting Officer

Commissioner of Patents and Trademarks